United States Patent
Jebrail et al.

(10) Patent No.: US 11,253,860 B2
(45) Date of Patent: Feb. 22, 2022

(54) DIGITAL MICROFLUIDIC DEVICES AND METHODS

(71) Applicant: mirOculus Inc., San Francisco, CA (US)

(72) Inventors: Mais J. Jebrail, Toronto (CA); Alexandra J. Cho, Toronto (CA); Victor Lee, Richmond Hill (CA)

(73) Assignee: mirOculus Inc., San Francisco, CA (US)

(*) Notice: Subject to any disclaimer, the term of this patent is extended or adjusted under 35 U.S.C. 154(b) by 218 days.

(21) Appl. No.: 16/455,459

(22) Filed: Jun. 27, 2019

(65) Prior Publication Data

US 2020/0061621 A1    Feb. 27, 2020

Related U.S. Application Data

(63) Continuation of application No. PCT/US2017/068839, filed on Dec. 28, 2017.
(Continued)

(51) Int. Cl.
*B01L 3/00* (2006.01)

(52) U.S. Cl.
CPC ..... *B01L 3/502792* (2013.01); *B01L 3/50273* (2013.01); *B01L 2200/027* (2013.01); *B01L 2200/16* (2013.01); *B01L 2300/0645* (2013.01); *B01L 2300/0816* (2013.01); *B01L 2300/0883* (2013.01); *B01L 2300/123* (2013.01); *B01L 2300/165* (2013.01); *B01L 2400/0427* (2013.01); *B01L 2400/0487* (2013.01)

(58) Field of Classification Search
None
See application file for complete search history.

(56) References Cited

U.S. PATENT DOCUMENTS

| | | | |
|---|---|---|---|
| 4,469,863 A | 9/1984 | Ts'o et al. | |
| 4,569,575 A | 2/1986 | Le Pesant et al. | |

(Continued)

FOREIGN PATENT DOCUMENTS

| | | |
|---|---|---|
| CA | 2470847 A1 | 7/2003 |
| CA | 2740113 A1 | 4/2010 |

(Continued)

OTHER PUBLICATIONS

Jebrail et al.; U.S. Appl. No. 16/614,396 entitled "Digital microfluidics systems and methods with integrated plasma collection device," filed Nov. 18, 2019.
(Continued)

*Primary Examiner* — Jennifer Wecker
*Assistant Examiner* — Kathryn Elizabeth Limbaugh
(74) *Attorney, Agent, or Firm* — Shay Glenn LLP

(57) ABSTRACT

Digital microfluidic (DMF) apparatuses, systems, devices and associated fluid manipulation and extraction devices, and methods of using them are presented. The devices may be useful for analysis of clinical, laboratory, chemical, or biological samples. A fluid application and extraction interface device may include a waste reservoir with a fluid trap and a transfer conduit extending through the waste reservoir so that fluid may pass from the transfer conduit into the waste reservoir and be trapped within the waste chamber. A transfer conduit may be configured to double back on itself and to hold a fluid sample. A DMF apparatus may be configured to hold and process large sample volumes.

18 Claims, 13 Drawing Sheets

Related U.S. Application Data

(60) Provisional application No. 62/439,641, filed on Dec. 28, 2016, provisional application No. 62/553,743, filed on Sep. 1, 2017, provisional application No. 62/557,714, filed on Sep. 12, 2017.

(56) References Cited

U.S. PATENT DOCUMENTS

| | | |
|---|---|---|
| 4,636,785 A | 1/1987 | Le Pesant |
| 4,818,052 A | 4/1989 | Le Pesant et al. |
| 5,034,506 A | 7/1991 | Summerton et al. |
| 5,130,238 A | 7/1992 | Malek et al. |
| 5,216,141 A | 6/1993 | Benner |
| 5,235,033 A | 8/1993 | Summerton et al. |
| 5,270,185 A | 12/1993 | Margolskee |
| 5,386,023 A | 1/1995 | Sanghvi et al. |
| 5,399,491 A | 3/1995 | Kacian et al. |
| 5,409,818 A | 4/1995 | Davey et al. |
| 5,411,876 A | 5/1995 | Bloch et al. |
| 5,455,166 A | 10/1995 | Walker |
| 5,486,337 A | 1/1996 | Ohkawa |
| 5,602,240 A | 2/1997 | De Mesmaeker et al. |
| 5,637,684 A | 6/1997 | Cook et al. |
| 5,644,048 A | 7/1997 | Yau |
| 5,681,702 A | 10/1997 | Collins et al. |
| 5,705,365 A | 1/1998 | Ryder et al. |
| 5,710,029 A | 1/1998 | Ryder et al. |
| 5,888,779 A | 3/1999 | Kacian et al. |
| 6,007,690 A | 12/1999 | Nelson et al. |
| 6,074,725 A | 6/2000 | Kennedy |
| 6,294,063 B1 | 9/2001 | Becker et al. |
| 6,352,838 B1 | 3/2002 | Krulevitch et al. |
| 6,401,552 B1 | 6/2002 | Elkins |
| 6,495,369 B1 | 12/2002 | Kercso et al. |
| 6,565,727 B1 | 5/2003 | Shenderov |
| 6,596,988 B2 | 7/2003 | Corso et al. |
| 6,723,985 B2 | 4/2004 | Schultz et al. |
| 6,773,566 B2 | 8/2004 | Shenderov |
| 6,787,111 B2 | 9/2004 | Roach et al. |
| 6,887,384 B1 | 5/2005 | Frechet et al. |
| 6,911,132 B2 | 6/2005 | Pamula et al. |
| 6,989,234 B2 | 1/2006 | Kolar et al. |
| 7,057,031 B2 | 6/2006 | Olejnik et al. |
| 7,147,763 B2 | 12/2006 | Elrod et al. |
| 7,163,612 B2 | 1/2007 | Sterling et al. |
| 7,214,302 B1 | 5/2007 | Reihs et al. |
| 7,323,345 B1 | 1/2008 | Stjernstrom |
| 7,328,979 B2 | 2/2008 | Deere et al. |
| 7,329,545 B2 | 2/2008 | Pamula et al. |
| 7,349,014 B2 | 3/2008 | Higashihara |
| 7,390,463 B2 | 6/2008 | He et al. |
| 7,391,020 B2 | 6/2008 | Bousse et al. |
| 7,439,014 B2 | 10/2008 | Pamula et al. |
| 7,445,926 B2 | 11/2008 | Mathies et al. |
| 7,531,120 B2 | 5/2009 | Van Rijn et al. |
| D599,832 S | 9/2009 | Chapin et al. |
| 7,713,456 B2 | 5/2010 | Dodd et al. |
| 7,727,723 B2 | 6/2010 | Pollack et al. |
| 7,745,207 B2 | 6/2010 | Jovanovich et al. |
| 7,763,471 B2 | 7/2010 | Pamula et al. |
| 7,815,871 B2 | 10/2010 | Pamula et al. |
| 7,816,121 B2 | 10/2010 | Pollack et al. |
| 7,822,510 B2 | 10/2010 | Paik et al. |
| 7,851,184 B2 | 12/2010 | Pollack et al. |
| 7,897,737 B2 | 3/2011 | Wu et al. |
| 7,901,947 B2 | 3/2011 | Pollack et al. |
| 7,919,330 B2 | 4/2011 | de Guzman et al. |
| 7,939,021 B2 | 5/2011 | Smith et al. |
| 7,998,436 B2 | 8/2011 | Pollack et al. |
| 8,007,739 B2 | 8/2011 | Pollack et al. |
| 8,041,463 B2 | 10/2011 | Pollack et al. |
| 8,053,239 B2 | 11/2011 | Wheeler et al. |
| 8,088,578 B2 | 1/2012 | Hua et al. |
| 8,093,062 B2 | 1/2012 | Winger |
| 8,137,917 B2 | 3/2012 | Pollack et al. |
| 8,187,864 B2 | 5/2012 | Wheeler et al. |
| 8,190,371 B2 | 5/2012 | Allawi et al. |
| 8,202,686 B2 | 6/2012 | Pamela et al. |
| 8,202,736 B2 | 6/2012 | Mousa et al. |
| 8,208,146 B2 | 6/2012 | Srinivasan et al. |
| 8,268,246 B2 | 9/2012 | Srinivasan et al. |
| 8,304,253 B2 | 11/2012 | Yi et al. |
| 8,317,990 B2 | 11/2012 | Pamula et al. |
| 8,349,276 B2 | 1/2013 | Pamula et al. |
| 8,364,315 B2 | 1/2013 | Sturmer et al. |
| 8,367,370 B2 | 2/2013 | Wheeler et al. |
| 8,389,297 B2 | 3/2013 | Pamula et al. |
| 8,394,641 B2 | 3/2013 | Winger |
| 8,399,222 B2 | 3/2013 | Siva et al. |
| 8,426,213 B2 | 4/2013 | Eckhardt et al. |
| 8,440,392 B2 | 5/2013 | Pamula et al. |
| 8,454,905 B2 | 6/2013 | Pope et al. |
| 8,460,528 B2 | 6/2013 | Pollack et al. |
| 8,470,153 B2 | 6/2013 | Feiglin et al. |
| 8,470,606 B2 | 6/2013 | Srinivasan et al. |
| 8,481,125 B2 | 7/2013 | Yi et al. |
| 8,492,168 B2 | 7/2013 | Srinivasan et al. |
| 8,562,807 B2 | 10/2013 | Srinivasan et al. |
| 8,591,830 B2 | 11/2013 | Sudarsan et al. |
| 8,592,217 B2 | 11/2013 | Eckhardt |
| 8,613,889 B2 | 12/2013 | Pollack et al. |
| 8,637,317 B2 | 1/2014 | Pamula et al. |
| 8,637,324 B2 | 1/2014 | Pollack et al. |
| 8,653,832 B2 | 2/2014 | Hadwen et al. |
| 8,658,111 B2 | 2/2014 | Srinivasan et al. |
| 8,685,344 B2 | 4/2014 | Sudarsan et al. |
| 8,685,754 B2 | 4/2014 | Pollack et al. |
| 8,702,938 B2 | 4/2014 | Srinivasan et al. |
| 8,716,015 B2 | 5/2014 | Pollack et al. |
| 8,809,068 B2 | 8/2014 | Sista et al. |
| 8,821,705 B2 | 9/2014 | Bjornson et al. |
| 8,845,872 B2 | 9/2014 | Pollack et al. |
| 8,846,414 B2 | 9/2014 | Sista et al. |
| 8,852,952 B2 | 10/2014 | Pollack et al. |
| 8,872,527 B2 | 10/2014 | Sturmer et al. |
| 8,877,512 B2 | 11/2014 | Srinivasan et al. |
| 8,888,969 B2 | 11/2014 | Soleymani et al. |
| 8,901,043 B2 | 12/2014 | Eckhardt et al. |
| 8,926,065 B2 | 1/2015 | Winger |
| 8,927,296 B2 | 1/2015 | Sista et al. |
| 8,936,708 B2 | 1/2015 | Feiglin et al. |
| 8,951,732 B2 | 2/2015 | Pollack et al. |
| 8,980,198 B2 | 3/2015 | Srinivasan et al. |
| 9,005,544 B2 | 4/2015 | Van Dam et al. |
| 9,011,662 B2 | 4/2015 | Wang et al. |
| 9,039,973 B2 | 5/2015 | Watson et al. |
| 9,046,514 B2 | 6/2015 | Sista et al. |
| 9,091,649 B2 | 7/2015 | Pollack et al. |
| 9,140,635 B2 | 9/2015 | Graham et al. |
| 9,188,615 B2 | 11/2015 | Sturmer et al. |
| 9,223,317 B2 | 12/2015 | Winger |
| 9,238,222 B2 | 1/2016 | Delattre et al. |
| 9,248,450 B2 | 2/2016 | Bauer |
| 9,377,439 B2 | 6/2016 | Lee et al. |
| 9,435,765 B2 | 9/2016 | Reimitz et al. |
| 9,446,404 B2 | 9/2016 | Bauer et al. |
| 9,476,811 B2 | 10/2016 | Mudrik et al. |
| 9,476,856 B2 | 10/2016 | Pamula et al. |
| 9,513,253 B2 | 12/2016 | Winger |
| 9,517,469 B2 | 12/2016 | Shenderov et al. |
| 9,594,056 B2 | 3/2017 | Fobel et al. |
| 9,851,365 B2 | 12/2017 | Mousa et al. |
| 10,232,374 B2 | 3/2019 | Jebrai et al. |
| 2002/0150683 A1 | 10/2002 | Troian et al. |
| 2003/0017551 A1 | 1/2003 | Parthasarathy et al. |
| 2003/0136451 A1 | 7/2003 | Beebe et al. |
| 2003/0194716 A1 | 10/2003 | Knoll |
| 2004/0171169 A1 | 9/2004 | Kallury et al. |
| 2004/0211659 A1 | 10/2004 | Velev |
| 2005/0115836 A1 | 6/2005 | Reihs |
| 2005/0133370 A1 | 6/2005 | Park et al. |
| 2005/0148091 A1 | 7/2005 | Kitaguchi et al. |
| 2005/0191759 A1 | 9/2005 | Pedersen Bjergaard et al. |
| 2005/0220675 A1 | 10/2005 | Reed et al. |

(56) References Cited

U.S. PATENT DOCUMENTS

| | | |
|---|---|---|
| 2006/0091015 A1 | 5/2006 | Lau |
| 2006/0132542 A1 | 6/2006 | Bruker et al. |
| 2006/0231398 A1 | 10/2006 | Sarrut et al. |
| 2006/0272942 A1 | 12/2006 | Sirringhaus |
| 2007/0023292 A1 | 2/2007 | Kim et al. |
| 2007/0095407 A1 | 5/2007 | Chen et al. |
| 2007/0148763 A1 | 6/2007 | Huh et al. |
| 2007/0269825 A1 | 11/2007 | Wang et al. |
| 2008/0110753 A1 | 5/2008 | Fourrier et al. |
| 2008/0131904 A1 | 6/2008 | Parce et al. |
| 2008/0156983 A1 | 7/2008 | Fourrier et al. |
| 2008/0169197 A1 | 7/2008 | McRuer et al. |
| 2008/0185339 A1 | 8/2008 | Delapierre et al. |
| 2008/0210558 A1 | 9/2008 | Sauter-Starace et al. |
| 2008/0241831 A1 | 10/2008 | Fan et al. |
| 2008/0293051 A1 | 11/2008 | Levy et al. |
| 2009/0017197 A1 | 1/2009 | Zhang et al. |
| 2009/0017453 A1 | 1/2009 | Maples et al. |
| 2010/0025250 A1 | 2/2010 | Pamula et al. |
| 2010/0032293 A1 | 2/2010 | Pollack et al. |
| 2010/0048410 A1 | 2/2010 | Shenderov et al. |
| 2010/0087012 A1 | 4/2010 | Shenderov |
| 2010/0120130 A1 | 5/2010 | Srinivasan et al. |
| 2010/0130369 A1 | 5/2010 | Shenderov et al. |
| 2010/0136544 A1 | 6/2010 | Agresti et al. |
| 2010/0206094 A1 | 8/2010 | Shenderov |
| 2010/0236927 A1 | 9/2010 | Pope et al. |
| 2010/0236928 A1 | 9/2010 | Srinivasan et al. |
| 2010/0236929 A1 | 9/2010 | Pollack et al. |
| 2010/0270156 A1 | 10/2010 | Srinivasan et al. |
| 2010/0288368 A1 | 11/2010 | Beebe et al. |
| 2010/0311599 A1 | 12/2010 | Wheeler et al. |
| 2011/0024793 A1 | 2/2011 | Jeon |
| 2011/0076685 A1 | 3/2011 | Moeller et al. |
| 2011/0097763 A1 | 4/2011 | Pollack et al. |
| 2011/0104725 A1 | 5/2011 | Pamula et al. |
| 2011/0104747 A1 | 5/2011 | Pollack et al. |
| 2011/0107822 A1 | 5/2011 | Bunner et al. |
| 2011/0147216 A1 | 6/2011 | Fan et al. |
| 2011/0240471 A1 | 10/2011 | Wheeler et al. |
| 2011/0247934 A1 | 10/2011 | Wang et al. |
| 2011/0293851 A1 | 12/2011 | Bollström et al. |
| 2011/0303542 A1 | 12/2011 | Srinivasan et al. |
| 2011/0311980 A1 | 12/2011 | Pollack et al. |
| 2012/0000777 A1 | 1/2012 | Garrell et al. |
| 2012/0045748 A1 | 2/2012 | Willson et al. |
| 2012/0045768 A1 | 2/2012 | Arunachalam et al. |
| 2012/0149018 A1 | 6/2012 | Dahlberg et al. |
| 2012/0190027 A1 | 7/2012 | Loeffert et al. |
| 2012/0208705 A1 | 8/2012 | Steemers et al. |
| 2012/0208724 A1 | 8/2012 | Steemers et al. |
| 2012/0259233 A1 | 10/2012 | Chan et al. |
| 2012/0261264 A1 | 10/2012 | Srinivasan et al. |
| 2012/0289581 A1 | 11/2012 | Chang et al. |
| 2012/0325665 A1 | 12/2012 | Chiou et al. |
| 2013/0017544 A1 | 1/2013 | Eckhardt et al. |
| 2013/0018611 A1 | 1/2013 | Sturmer |
| 2013/0062205 A1 | 3/2013 | Hadwen et al. |
| 2013/0068622 A1 | 3/2013 | Schertzer et al. |
| 2013/0105318 A1 | 5/2013 | Bhattacharya et al. |
| 2013/0123979 A1 | 5/2013 | Elliot et al. |
| 2013/0157259 A1 | 6/2013 | Choi et al. |
| 2013/0168250 A1 | 7/2013 | Fogleman et al. |
| 2013/0171546 A1 | 7/2013 | White et al. |
| 2013/0177915 A1 | 7/2013 | Too et al. |
| 2013/0203606 A1 | 8/2013 | Pollack et al. |
| 2013/0215492 A1 | 8/2013 | Steckl et al. |
| 2013/0217113 A1 | 8/2013 | Srinivasan et al. |
| 2013/0225450 A1 | 8/2013 | Pollack et al. |
| 2013/0270114 A1 | 10/2013 | Feiglin |
| 2013/0284956 A1 | 10/2013 | Kwon |
| 2013/0288254 A1 | 10/2013 | Pollack et al. |
| 2013/0293246 A1 | 11/2013 | Pollack et al. |
| 2013/0306480 A1 | 11/2013 | Chang et al. |
| 2014/0005066 A1 | 1/2014 | Boles et al. |
| 2014/0054174 A1 | 2/2014 | Wang |
| 2014/0124037 A1 | 5/2014 | Foley |
| 2014/0141409 A1 | 5/2014 | Foley et al. |
| 2014/0161686 A1 | 6/2014 | Bort et al. |
| 2014/0174926 A1 | 6/2014 | Bort et al. |
| 2014/0179539 A1 | 6/2014 | Lohman et al. |
| 2014/0194305 A1 | 7/2014 | Kayyem et al. |
| 2014/0216559 A1 | 8/2014 | Foley |
| 2014/0273100 A1 | 9/2014 | Saito et al. |
| 2014/0335069 A1 | 11/2014 | Graham et al. |
| 2015/0001078 A1 | 1/2015 | Feiglin |
| 2015/0021182 A1 | 1/2015 | Rival et al. |
| 2015/0075986 A1 | 3/2015 | Cyril et al. |
| 2015/0111237 A1 | 4/2015 | Graham et al. |
| 2015/0144489 A1 | 5/2015 | Hoffmeyer et al. |
| 2015/0205272 A1 | 7/2015 | Yi et al. |
| 2015/0212043 A1 | 7/2015 | Pollack |
| 2015/0258520 A1 | 9/2015 | Griffiths et al. |
| 2015/0267242 A1 | 9/2015 | Foegeding et al. |
| 2016/0068901 A1 | 3/2016 | Eckhardt et al. |
| 2016/0108432 A1 | 4/2016 | Punnamaraju et al. |
| 2016/0116438 A1 | 4/2016 | Pamula et al. |
| 2016/0129437 A1 | 5/2016 | Kayyem et al. |
| 2016/0161343 A1 | 6/2016 | Smith et al. |
| 2016/0175859 A1 | 6/2016 | Yi et al. |
| 2016/0199832 A1 | 7/2016 | Jamshidi et al. |
| 2016/0298173 A1 | 10/2016 | Wang et al. |
| 2016/0319354 A1 | 11/2016 | Tocigl et al. |
| 2016/0370317 A9 | 12/2016 | Sudarsan et al. |
| 2017/0315090 A1 | 11/2017 | Wheeler et al. |
| 2017/0354973 A1 | 12/2017 | Sustarich et al. |
| 2018/0095067 A1 | 4/2018 | Huff et al. |
| 2018/0099275 A1 | 4/2018 | Wu et al. |
| 2018/0120335 A1 | 5/2018 | Mousa et al. |
| 2018/0141049 A1 | 5/2018 | Jebrail et al. |
| 2018/0178217 A1 | 6/2018 | Jebrail et al. |
| 2018/0250672 A1 | 9/2018 | Jamshidi et al. |
| 2019/0168223 A1 | 6/2019 | Soto-Moreno et al. |
| 2019/0210026 A1 | 7/2019 | Jebrai et al. |
| 2019/0217301 A1 | 7/2019 | Hong et al. |
| 2020/0316606 A1 | 10/2020 | Soto-Moreno et al. |

FOREIGN PATENT DOCUMENTS

| | | |
|---|---|---|
| CN | 1668527 A | 9/2005 |
| CN | 101609063 A | 12/2009 |
| CN | 102549804 A | 7/2012 |
| CN | 102719526 A | 10/2012 |
| CN | 102836653 A | 12/2012 |
| CN | 103014148 A | 4/2013 |
| CN | 103170383 A | 6/2013 |
| CN | 106092865 A | 11/2016 |
| EP | 2111554 B1 | 5/2013 |
| GB | 2533952 A | 7/2016 |
| JP | 2002321449 A | 11/2002 |
| JP | 2006220606 A | 8/2006 |
| JP | 2010500596 A | 1/2010 |
| JP | 2010098133 A | 4/2010 |
| JP | 2010515877 A | 5/2010 |
| JP | 2010180222 A | 8/2010 |
| JP | 2012525687 A | 10/2012 |
| WO | WO2000/067907 A2 | 11/2000 |
| WO | WO2001/025137 A1 | 4/2001 |
| WO | WO2003/045556 A2 | 6/2003 |
| WO | WO2004/074169 A1 | 9/2004 |
| WO | WO2005/068993 A1 | 7/2005 |
| WO | WO2005/118129 A1 | 12/2005 |
| WO | WO2006/000828 A2 | 1/2006 |
| WO | WO2006/102309 A2 | 9/2006 |
| WO | WO2007/120240 A2 | 10/2007 |
| WO | WO2007/123908 A2 | 11/2007 |
| WO | WO2007/130294 A2 | 11/2007 |
| WO | WO2007/136386 A2 | 11/2007 |
| WO | WO2008/066828 A2 | 6/2008 |
| WO | WO2009/026339 A2 | 2/2009 |
| WO | WO2009/052348 A2 | 4/2009 |
| WO | WO2009/111723 A1 | 9/2009 |
| WO | WO2009/111769 A2 | 9/2009 |
| WO | WO2009/140671 A2 | 11/2009 |

(56) References Cited

FOREIGN PATENT DOCUMENTS

| WO | WO2010/003188 A1 | 1/2010 |
|---|---|---|
| WO | WO2010/006166 A2 | 1/2010 |
| WO | WO2010/027894 A2 | 3/2010 |
| WO | WO2010/042637 A2 | 4/2010 |
| WO | WO2010/069977 A1 | 6/2010 |
| WO | WO2010/091334 A2 | 8/2010 |
| WO | WO2010/111265 A1 | 9/2010 |
| WO | WO2011/002957 A2 | 1/2011 |
| WO | WO2011/062557 A1 | 5/2011 |
| WO | WO2012/061832 A1 | 5/2012 |
| WO | WO2012/172172 A1 | 12/2012 |
| WO | WO2013/006312 A2 | 1/2013 |
| WO | WO2013/040562 A2 | 3/2013 |
| WO | WO2013/090889 A1 | 6/2013 |
| WO | WO2013/096839 A1 | 6/2013 |
| WO | WO2013/116039 A1 | 8/2013 |
| WO | WO2013/176767 A1 | 11/2013 |
| WO | WO2014/078100 A1 | 5/2014 |
| WO | WO2014/100473 A1 | 6/2014 |
| WO | WO2014/106167 A1 | 7/2014 |
| WO | WO2014/108185 A1 | 7/2014 |
| WO | WO2014/183118 A1 | 11/2014 |
| WO | WO2015/023745 A1 | 2/2015 |
| WO | WO2015/172255 A1 | 11/2015 |
| WO | WO2015/172256 A1 | 11/2015 |
| WO | WO2016/128544 A1 | 8/2016 |
| WO | WO2016/182814 A2 | 11/2016 |
| WO | WO2016/197013 A1 | 12/2016 |
| WO | WO2017/223026 A1 | 12/2017 |
| WO | WO2018/119253 A1 | 6/2018 |
| WO | WO2018/126082 A1 | 7/2018 |
| WO | WO2018/187476 A1 | 10/2018 |
| WO | WO2019/023133 A1 | 1/2019 |
| WO | WO2019/046860 A1 | 3/2019 |
| WO | WO2019/0752 11 A1 | 4/2019 |

OTHER PUBLICATIONS

Hong et al.; U.S. Appl. No. 16/726,740 entitled "Feedback system for parallel droplet control in a digital microfluidic device," filed Dec. 24, 2019.
Abdelgawad et al., All-terrain droplet actuation, Lab on a Chip, 8(5), pp. 672-677, May 2008.
Abdelgawad et al.; Low-cost, rapid-prototyping of digital microfluidics devices, Microfluidics and Nanofluidics, 4, pp. 349-355, Apr. 2008.
Abdelgawad et al.; Rapid prototyping in copper substrates for digital microfluidics, Adv. Mater., 19(1), pp. 133-137; Jan. 2007.
Abdelgawad et al; Hybrid microfluidics: a digital-to-channel interface for in-line sample processing and chemical separations, Lab on a Chip, 9(8), pp. 1046-1051, Apr. 2009.
Abdelgawad; Digital Microfluidics for Integration of Lab-on-a-Chip Devices (Doctoral dissertation); University of Toronto; © 2009.
Albrecht et al.; Laboratory testing of gonadal steroids in children; Pediatric Endocrinology Reviews; 5(suppl 1); pp. 599-607; Oct. 2007.
Analog Devices; Extending the capacitive input range of AD7745/AD7746 Capicitance-to-Digital converter; Analog Devices; Norwood, MA; 5 pages; (year of pub. sufficiently earlier than effective US filing date and any foreign priority date) 2009.
Analog Devices; 24-bit Capicitance-to-Digital converter with temperature sensor, AD7745/AD7746; Analog Devices; Norwood, MA; 28 pages; (year of pub. sufficiently earlier than effective US filing date and any foreign priority date) 2005.
Ankarberg-Lindren et al.; A purification step prior to commercial sensitive immunoassay is necessary to achieve clinical usefulness when quantifying serum 17 ?-estradiol in prepubertal children. Eur J Endocrinol, 158, pp. 117-124, Jan. 2008.
Armstrong et al.; A study of plasma free amino acid levels. II. Normal values for children and adults, Metabolism, 22(4), pp. 561-569, Apr. 1973.

Asiello et al.; Miniaturized isothermal nucleic acid amplification, a review; Lab Chip; 11(8); pp. 1420-1430; Apr. 2011.
Au et al., Integrated microbioreactor for culture and analysis of bacteria, algae and yeast, Biomedical Microdevices, 13(1), pp. 41-50, Feb. 2011.
Au et al.; A new angle on pluronic additives: Advancing droplets and understanding in digital microfluidics; Langmuir; 27; pp. 8586-8594; Jun. 2011.
Banatvala et al., Rubella, The Lancet, 363(9415), pp. 1127-1137, Apr. 2004.
Banér et al.; Signal amplification of padlock probes by rolling circle replication; Nuc. Acids Res.; 26(22); pp. 5073-5078; Nov. 1998.
Barany; Genetic disease detection and DNA amplification using cloned thermostable ligase; PNAS; 88(1); pp. 189-193; Jan. 1991.
Barbulovic-Nad et al., A microfluidic platform for complete mammalian cell culture, Lab on a Chip, 10(12), pp. 1536-1542; Jun. 2010.
Barbulovic-Nad et al.; Digital microfluidics for cell-based assays, Lab Chip, 8(4), pp. 519-526; Apr. 2008.
Beattie et al.; Endogenous sex hormones, breast cancer risk, and tamoxifen response: an ancillary study in the NSABP Breast Cancer Prevention Trial P-1, J Natl Cancer Inst, 98(2), pp. 110-115, Jan. 2006.
Beaucage et al., The Functionalization of Oligonucleotides Via Phosphoramidite Derivatives, Tetrahedron, 49(10), pp. 1925-1963, Mar. 1993.
Belanger et al.; Omental and subcutaneous adipose tissue steroid levels in obese men. Steroids, 71(8), pp. 674-682, Aug. 2006.
Bergkvist et al., Improved chip design for integrated solid-phase microextraction in on-line proteomic sample preparation, Proteomics, 2(4), pp. 422-429, Apr. 2002.
Bi et al.; Dumbbell probe-mediated cascade isothermal amplification: A novel strategy for label-free detection of microRNAs and its application to real sample assay; Analytics Chimica Acta; 760; pp. 69-74; Jan. 2013.
Blankenstein et al.; Intratumoral levels of estrogens in breast cancer. J Steroid Biochem Mol Biol, 69(1-6), pp. 293-297, Apr.-Jun. 1999.
Bodamer et al.; Expanded newborn screening in Europe, Journal of Inherited Metabolic Disease, 30(4), pp. 439-444, Aug. 2007.
Bohlen et al.; Fluorometric assay of proteins in the nanogram range, Archives of Biochemistry and Biophysics, 155(1), pp. 213-220, Mar. 1973.
Bollström et al.; A Multilayer Coated Fiber-Based Substrate Suitable For Printed Functionality; Organic Electronics; 10(5); pp. 1020-1023; Aug. 2009.
Bonneil et al., Integration of solid-phase extraction membranes for sample multiplexing: Application to rapid protein identification from gel-isolated protein extracts, Electrophoresis, 23(20), pp. 3589-3598, Oct. 2002.
Brassard et al.; Water-oil core-shell droplets for electrowetting-based digital microfluidic devices; Lab Chip; 8(8); pp. 1342-1349; Aug. 2008.
Brill et al., Synthesis of oligodeoxynucleoside phosphorodithioates via thioamidites, J. Am. Chem. Soc., 111(6), pp. 2321-2322, Mar. 1989.
Brivio et al.; Integrated microfluidic system enabling (bio)chemical reactions with on-line MALDI-TOF mass spectrometry, Anal. Chem., 74(16), pp. 3972-3976, Aug. 2002.
Burstein; Aromatase inhibitor-associated arthralgia syndrome. Breast, 16(3), pp. 223-234, Jun. 2007.
Carlsson et al., Screening for genetic mutations, Nature, 380(6571), pp. 207, Mar. 1996.
Chace et al.; A biochemical perspective on the use of tandem mass spectrometry for newborn screening and clinical testing, Clinical Biochemistry, 38(4), pp. 296-309; Apr. 2005.
Chace et al.; Rapid diagnosis of maple syrup urine disease in blood spots from newborns by tandem mass spectrometry, Clinical Chemistry, 41(1), pp. 62-68, Jan. 1995.
Chace et al.; Rapid diagnosis of phenylketonuria by quantitative analysis for phenylalanine and tyrosine in neonatal blood spots by tandem mass spectrometry, Clinical Chemistry, 39(1), pp. 66-71; Jan. 1993.

(56) References Cited

OTHER PUBLICATIONS

Chace et al.; Use of tandem mass spectrometry for multianalyte screening of dried blood specimens from newborns, Clinical Chemistry, 49(11), pp. 1797-1817, Nov. 2003.

Chace; Mass spectrometry in newborn and metabolic screening: historical perspective and future directions, Journal of Mass Spectrometry, 44(2), pp. 163-170, Feb. 2009.

Chang et al.; Integrated polymerase chain reaction chips utilizing digital microfluidics; Biomedical Microdevices; 8(3); pp. 215-225; Sep. 2006.

Chatterjee et al.; Droplet-based microfluidics with nonaqueous solvents and solutions, Lab Chip, 6(2), pp. 199-206, Feb. 2006.

Chen et al.; Selective Wettability Assisted Nanoliter Sample Generation Via Electrowetting-Based Transportation; Proceedings of the 5th International Conference on Nanochannels, Microchannels and Minichannels (ICNMM); Puebla, Mexico; Paper No. ICNMM2007-30184; pp. 147-153; Jun. 18-20, 2007.

Cheng et al., Paper-Based ELISA, Angewandte Chemie, 49(28), pp. 4771-4774, Jun. 2010.

Cheng et al.; Highly Sensitive Determination of microRNA Using Target-Primed and Branched Rolling-Circle Amplification; Angew. Chem.; 121(18); pp. 3318-3322; Apr. 2009.

Chetrite et al.; Estradiol inhibits the estrone sulfatase activity in normal and cancerous human breast tissues. Journal of Steroid Biochemistry and Molecular Biology, 104(3-5), pp. 289-292, May 2007.

Cho et al.; Creating, transporting, cutting, and merging liquid droplets by electrowetting-based actuation for digital microfluidic circuits, J. MEMS 2003, 12(1), pp. 70-80, Feb. 2003.

Choi et al., Automated digital microfluidic platform for magnetic-particle-based immunoassays with optimization by design of experiments, Anal. Chem., 85(20), pp. 9638-9646; Oct. 2013.

Choi et al., Digital Microfluidics, Annu. Rev. Anal. Chem., 5, pp. 413-440, (Epub) Apr. 2012.

Christiansen; Hormone Replacement Therapy and Osteoporosis; Maturitas, 23, Suppl. pp. S71-S76, May 1996.

Chuang et al.; Direct Handwriting Manipulation of Droplets By Self-Aligned Mirror-EWOO Across A Dielectric Sheet; 19th IEEE International Conf. on Micro Electro Mechanical Systems (MEMS); Instanbul, Turkey; pp. 538-541; Jan. 22-26, 2006.

Cipriano et al.; The cost-effectiveness of expanding newborn screening for up to 21 inherited metabolic disorders using tandem mass spectrometry: results from a decision-analytic model, Value in Health, 10(2), pp. 83-97, Mar.-Apr. 2007.

Cooney et al.; Electrowetting droplet microfluidics on a single planar surface, Microfluid. Nanofluid., 2(5), pp. 435-446; Sep. 2006.

CoreGenomics; How do SPRI beads work; 31 pages; retrieved from the internet (http://core-genomics.blogspot.com/2012/04/how-do-spri-beads-work.html); Apr. 28, 2012.

Crabtree et al.; Microchip injection and separation anomalies due to pressure effects, Anal. Chem., 73(17), pp. 4079-4086, Sep. 2001.

Cunningham; Testosterone replacement therapy for late-onset hypogonadism. Nature Clinical Practice Urology, 3(5), pp. 260-267, May 2006.

Cuzick; Chemoprevention of breast cancer. Women's Health, 2(6), pp. 853-861, Nov. 2006.

Dahlin et al.; Poly(dimethylsiloxane)-based microchip for two-dimensional solid-phase extraction-capillary electrophoresis with an integrated electrospray emitter tip, Anal. Chem., 77(16), pp. 5356-5363, Aug. 2005.

Danton et al.; Porphyrin profiles in blood, urine and faeces by HPLC/electrospray ionization tandem mass spectrometry. Biomedical Chromatography, 20(6-7), pp. 612-621, Jun.-Jul. 2006.

De Mesmaeker et al.; Comparison of rigid and flexible backbones in antisense oligonucleotides; Bioorganic & Medicinal Chem. Lett; 4(3); pp. 395-398; Feb. 1994.

Deligeorgiev et al.; Intercalating Cyanine Dyes for Nucleic Acid Detection; Recent Pat Mat Sci; 2(1); pp. 1-26; Jan. 2006.

Dempcy et al., Synthesis of a thymidyl pentamer of deoxyribonucleic guanidine and binding studies with DNA homopolynucleotides, Proc. Natl. Acad. Sci., 92(13), pp. 6097-6101, Jun. 1995.

Deng et al.; Rapid determination of amino acids in neonatal blood samples based on derivatization with isobutyl chloroformate followed by solid-phase microextraction and gas chromatography/mass spectrometry. Rapid Communications in Mass Spectrometry, 18(1), pp. 2558-2564, Nov. 2004.

Denneulin et al.; Infra-red assisted sintering of inkjet printed silver tracks on paper substrates; J Nanopart Res; 13(9); pp. 3815-3823; Sep. 2011.

Dibbelt et al.; Determination of natural and synthetic estrogens by radioimmunoassay: Comparison of direct and extraction methods for quantification of estrone in human serum. Clinical Laboratory, 44(3), 137-143, Mar. 1998.

Dietzen et al.; National academy of clinical biochemistry laboratory medicine practice guidelines: follow-up testing for metabolic disease identified by expanded newborn screening using tandem mass spectrometry; executive summary, Clinical Chemistry, 55(9), pp. 1615-1626, Sep. 2009.

Diver et al.; Warning on plasma oestradiol measurement. Lancet, 330(8567), p. 1097, Nov. 1987.

Divino Filho et al.; Simultaneous measurements of free amino acid patterns of plasma, muscle and erythrocytes in healthy human subjects, Clinical Nutrition, 16(6), pp. 299-305, Dec. 1997.

Djerassi; Chemical birth of the pill. American Journal of Obstetrics and Gynecology, 194(1), pp. 290-298, Jan. 2006.

Dobrowolski et al.; DNA microarray technology for neonatal screening, Acta Paediatrica Suppl, 88(432), pp. 61-64, Dec. 1999.

Dong et al.; Highly sensitive multiple microRNA detection based on flourescence quenching of graphene oxide and isothermal strand-displacement polymerase reaction; Anal Chem; 84; pp. 4587-4593; Apr. 2012.

Dryden et al.; Integrated digital microfluidic platform for voltammetric analysis; Analytical Chemistry; 85(18); pp. 8809-8816; Sep. 2013.

Duffy et al.; Rapid prototyping of microfluidic systems in Poly (dimethylsiloxane), Anal. Chem., 70(23), pp. 4974-4984, Dec. 1998.

Edgar et al.; Capillary electrophoresis separation in the presence of an immiscible boundary for droplet analysis, Anal. Chem., 78(19), pp. 6948-6954 (author manuscript, 15 pgs.), Oct. 2006.

Egholm et al., PNA hybridizes to complementary oligonucleotides obeying the Watson-Crick hydrogen-bonding rules, Nature, 365(6446), pp. 566-568, Oct. 1993.

Egholm et al., Recognition of guanine and adenine in DNA by cytosine and thymine containing peptide nucleic acids (PNA), J. Am. Chem. Soc., 114(24), pp. 9677-9678; Nov. 1992.

Ehrmann; Polycystic ovary syndrome. New England Journal of Medicine; 352(12); pp. 1223-1236; Mar. 2005.

Ekstrom et al., Miniaturized solid-phase extraction and sample preparation for MALDI MS using a microfabricated integrated selective enrichment target, Journal of Proteome Research, 5(5), pp. 1071-1081, May 2006.

Ekstrom et al., Polymeric integrated selective enrichment target (ISET) for solid-phase-based sample preparation in MALDI-TOF MS, Journal of Mass Spectrometry, 42(11), pp. 1445-1452, Nov. 2007.

Ekstrom et al.,On-chip microextraction for proteomic sample preparation of in-gel digests, Proteomics, 2(4), pp. 413-421, Apr. 2002.

El-Ali et al.; Cells on chips; Nature (2006) insight Review; 442(7101); pp. 403-411; Jul. 2006.

Fair; Digital microfluidics: Is a true lab-on-a-chip possible?; Microfiud. Nanofluid.; 3(3); pp. 245-281; Jun. 2007.

Falk et al.; Measurement of Sex Steroid Hormones in Breast Adipocytes: Methods and Implications; Cancer Epidemiol Biomarkers Prev; 17(8); pp. 1891-1895; Aug. 2008.

Fan et al.; Cross-scale electric manipulations of cells and droplets by frequency-modulated dielectrophoresis and electrowetting; Lab Chip; 8(8); pp. 1325-1331; Aug. 2008.

Fan et al.; Electrically Programmable Surfaces for Configurable Patterning of Cells; Advanced Materials; 20(8); pp. 1418-1423; Apr. 2008.

(56) References Cited

OTHER PUBLICATIONS

Fobel et al.; DropBot: An open-source digital microfluidic control system with precise control of electrostatic driving force and instantaneous drop velocity measurement; Applied Physics Letters; 102(19); 193513 (5 pgs.); May 2013.

Foote et al., Preconcentration of proteins on microfluidic devices using porous silica membranes, Analytical Chemistry, 77(1), pp. 57-63, Jan. 2005.

Freire et al.; A practical interface for microfluidics and nanoelectrospray mass spectrometry, Electrophoresis, 29(9), pp. 1836-1843, May 2008.

Fridley et al., Controlled release of dry reagents in porous media for tunable temporal and spatial distribution upon rehydration, Lab Chip, 12(21), pp. 4321-4327 (author manuscript, 14 pgs.), Nov. 2012.

Fu et al., Controlled Reagent Transport in Disposable 2D Paper Networks, Lab. Chip, 10(7), pp. 918-920 (author manuscript, 9 pgs.), Apr. 2010.

Gao et al.; Unusual conformation of a 3'-thioformacetal linkage in a DNA duplex; J. Biomol. NMR; 4(1); pp. 17-34; Jan. 1994.

Gentili et al.; Analysis of free estrogens and their conjugates in sewage and river waters by solid-phase extraction then liquid chromatography-electrospray-tandem mass spectrometry. Chromatographia 56(1), pp. 25-32, Jul. 2002.

Gerasimova et al.; Fluorometric method for phenylalanine microplate assay adapted for phenylketonuria screening, Clinical Chemistry, 35(10), pp. 2112-2115, Oct. 1989.

Gong et al., All-Electronic Droplet Generation On-Chip With Real-Time Feedback Control For EWOD Digital Microfluidics, Lab Chip, 8(6), pp. 898-906 (author manuscript, 20 pgs.), Jun. 2008.

Gong et al.; Portable digital microfluidics platform with active but disposable lab-on-chip; 17th IEEE International Conference on Micro Electro Mechanical Systems; Maastricht, Netherlands; pp. 355-358; Jan. 24-29, 2004.

Gong et al.; Two-dimensional digital microfluidic system by multilayer printed circuit board, 18th IEEE International Conference on Micro Electro Mechanical Systems (MEMS 2005); IEEE; pp. 726-729; Jan. 30-Feb. 3, 2005.

Goto et al.; Colorimetric detection of loop-mediated isothermal amplification reaction by using hydroxy naphthol blue; Biotechniques; 46(3); pp. 167-172; Mar. 2009.

Gottschlich et al.; Integrated microchip-device for the digestion, separation and postcolumn labeling of proteins and peptides, J. Chromatogr. B, 745(1), pp. 243-249, Aug. 2000.

Govindarajan et al., A low cost point-of-care viscous sample preparation device for molecular diagnosis in the developing world; an example of microfluidic origami, Lab Chip, 12(1), pp. 174-181, Jan. 2012.

Green et al.; Neonatal screening by DNA microarray: spots and chips, Nature Reviews Genetics, 6(2), pp. 147-151, Feb. 2005.

Hatch et al., Integrated preconcentration SDS-PAGE of proteins in microchips using photopatterned cross-linked polyacrylamide gels, Analytical Chemistry, 78(14), pp. 4976-4984, Jul. 2006.

He et al. (ed); Food microbiological inspection technology; Chapter 5: Modern food microbiological inspection technology; China Quality Inspection press; pp. 111-113; (English Translation included) Nov. 2013.

Henderson et al.; Estrogens as a cause of human cancer: The Richard and Hinda Rosenthal Foundation award lecture. Cancer Res, 48(2), pp. 246-253, Jan. 1988.

Herdewijn et al.; 2'-5'-Oligoadenylates (2-5A) As Mediators of Interferon Action. Synthesis and Biological Activity of New 2-5A Analogues. E. De Clerq (ed.) Frontiers in Microbiology, 231-232, Springer, Dordrecht Jan. 1987.

Hertz et al.; Estrogen-progestogen combinations for contraception. Journal of the American Medical Association, 198(9), pp. 1000-1006, Nov. 1966.

Hong et al.; Three-dimensional digital microfluidic manipulation of droplets in oil medium; Scientific Reports; 5 (Article No. 10685); 5 pgs.; Jun. 2015.

Horn et al.; Oligonucleotides with alternating anionic and cationic phosphoramidate linkages: Synthesis and hybridization of stereo-uniform isomers; Tetrahedron Lett.; 37(6); pp. 743-746; Feb. 1996.

Hou et al.; Microfluidic devices for blood fractionation; Micromachines; 2(3); pp. 319-343; Jul. 20, 2011.

Huh et al.; Reversible Switching of High-Speed Air-Liquid Two-Phase Flows Using Electrowetting-Assisted Flow-Pattern Change, J. Am. Chem. Soc., 125, pp. 14678-14679; Dec. 2003.

Ihalainen et al; Application of paper-supported printed gold electrodes for impedimetric immunosensor development; Biosensors; 3(1); pp. 1-17; Mar. 2013.

Jacobson et al.; High-Speed Separations on a Microchip, Anal. Chem., 66(7), pp. 1114-1118, Apr. 1994.

Jacobson et al.; Precolumn Reactions with Electrophoretic Analysis Integrated on a Microchip, Anal. Chem., 66(23), pp. 4127-4132, Dec. 1994.

Jebrail et al., Combinatorial Synthesis of Peptidomimetics Using Digital Microfluidics, J. Flow Chem., 2(3), pp. 103-107; (online) Aug. 2012.

Jebrail et al., Let's get digital: digitizing chemical biology with microfluidics, Curr. Opin. Chem. Biol., 14(5), 574-581, Oct. 2010.

Jebrail et al., Synchronized synthesis of peptide-based macrocycles by digital microfluidics, Angew. Chem. Int. Ed. Eng., 49(46), pp. 8625-8629, Nov. 2010.

Jebrail et al., World-to-digital-microfluidic interface enabling extraction and purification of RNA from human whole blood, Analytical Chemistry, 86(8), pp. 3856-3862, Apr. 2014.

Jebrail et al., A Solvent Replenishment Solution for Managing Evaporation of Biochemical Reactions in Air-Matrix Digital Microfluidics Devices, Lab on a Chip, 15(1), pp. 151-158; Jan. 2015.

Jebrail et al.; Digital Microfluidic Method for Protein Extraction by Precipitation; Analytical Chemistry; 81(1); pp. 330-335; Jan. 2009.

Jebrail et al.; Digital Microfluidics for Automated Proteomic Processing, Journal of Visualized Experiments, 33 (e1603), 5 pgs., Nov. 2009.

Jebrail et al.; Digital microfluidics: a versatile tool for applications in chemistry, biology and medicine; Lab Chip; 12 (14); pp. 2452-2463; Jul. 2012.

Jemere et al., An integrated solid-phase extraction system for sub-picomolar detection, Electrophoresis, 23(20), pp. 3537-3544, Oct. 2002.

Jenkins et al., The biosynthesis of carbocyclic nucleosides; Chem. Soc. Rev.; 24(3); pp. 169-176; Jan. 1995.

Jessome et al.; Ion Suppression: A Major Concern in Mass Spectrometry. LC-GC North America, 24(5), pp. 498-510, May 2006.

Jia et al.; Ultrasensitive detection of microRNAs by exponential isothermal amplification; Angew. Chem. Int. Ed. Engl.; 49(32); pp. 5498-5501; Jul. 2010.

Jung et al.; Hybridization of Alternating Cationic/Anionic Oligonucleotides to RNA Segments; Nucleosides & Nucleotides; 13(6-7); pp. 1597-1605; Jul. 1994.

Kaaks et al.; Postmenopausal serum androgens, oestrogens and breast cancer risk: The European prospective investigation into cancer and nutrition. Endocrine-Related Cancer, 12(4), pp. 1071-1082, Dec. 2005.

Keng et al., Micro-chemical synthesis of molecular probes on an electronic microfluidic device, PNAS, 109(3), pp. 690-695; Jan. 2012.

Kiedrowski et al., Parabolic Growth of a Self-Replicating Hexadeoxynucleotide Bearing a 3'-5'-Phosphoamidate Linkage; Angew. Chemie Intl. Ed.; 30(4); pp. 423-426; Apr. 1991.

Kim et al., A Microfluidic DNA Library Preparation Platform for Next-Generation Sequencing, PLoS One, 8(7), Article ID: e68988; 9 pgs., Jul. 2013.

Kim et al.; Microfabricated Monolithic Multinozzle Emitters for Nanoelectrospray Mass Spectrometry; Anal Chem; 79(10); pp. 3703-3707; May 2007.

Kralj et al.; Integrated continuous microfluidic liquid-liquid extraction. Lab on a Chip, 7(2), pp. 256-263, Feb. 2007.

Kutter et al., Solid phase extraction on microfluidic devices, Journal of Microcolumn Separations, 12(2), pp. 93-97, Jan. 2000.

(56) References Cited

OTHER PUBLICATIONS

Kutter et al., Solvent-Programmed Microchip Open-Channel Electrochromatography, Analytical Chemistry, 70(15), pp. 3291-3297, Aug. 1998.

Labrie et al.; Androgen glucuronides, instead of testosterone, as the new markers of androgenic activity in women. The Journal of Steroid Biochemistry and Molecular Biology, 99(4-5), pp. 182-188, Jun. 2006.

Labrie; Intracrinology. Molecular and Cellular Endocrinology, 78(3), pp. C113-C118, Jul. 1991.

Lamar et al.; Serum sex hormones and breast cancer risk factors in postmenopausal women. Cancer Epidemiol Biomarkers Prev, 12(4), pp. 380-383, Apr. 2003.

Langevin et al., A rapid and unbiased method to produce strand-specific RNA-Seq libraries from small quantities of starting materiaRNA Biol., 10(4), pp. 502-515, (online) Apr. 2013.

Lawyer et al.; High-level expression, purification, and enzymatic characterization of full-length Thermus aquaticus DNA polymerase and a truncated form deficient in 5' to 3' exonuclease activity; Genome Res; 2(4); pp. 275-287; May 1993.

Lawyer et al.; Isolation, characterization, and expression in *Escherichia coli* of the DNA polymerase gene from Thermus aquaticus; J. Biol. Chem.; 264; pp. 6427-6437; Apr. 1989.

Lebrasseur et al.; Two-dimensional electrostatic actuation of droplets using a single electrode panel and development of disposable plastic film card; Sensors and Actuators A; 136(1); pp. 368-386; May 2007.

Lee et al.; Electrowetting and electrowetting-on-dielectric for microscale liquid handling, Sens. Actuators A, 95(2), pp. 259-268, Jan. 2002.

Lee et al.; Removal of bovine serum albumin using solid-phase extraction with in-situ polymerized stationary phase in a microfluidic device; Journal of Chromatography A; 1187(1-2); pp. 11-17; Apr. 2008.

Lee et al.; Surface-Tension-Driven Microactuation Based on Continuous Electrowetting; J. Microelectromechanical Systems; 9(2); pp. 171-180; Jun. 2000.

Letsinger et al., Cationic oligonucleotides, J. Am. Chem. Soc., 110(13), pp. 4470-4471, Jun. 1988.

Letsinger et al., Effects of pendant groups at phosphorus on binding properties of d-ApA analogues, Nucl. Acids Res., 14(8), pp. 3487-3499, Apr. 1986.

Letsinger et al., Phosphoramidate analogs of oligonucleotides, J. Org. Chem., 35(11), pp. 3800-3803, Nov. 1970.

Lettieri et al., A novel microfluidic concept for bioanalysis using freely moving beads trapped in recirculating flows, Lab on a Chip, 3(1), pp. 34-39, Feb. 2003.

Levy et al.; Genetic screening of newborns, Annual Review of Genomics and Human Genetics, 1, pp. 139-177, Sep. 2000.

Li et al.; A Low-Cost and High resolution droplet position detector for an intelligent electrowetting on dielectric device; Journal of Lab. Automation 2015; 20(6); pp. 663-669; Dec. 2015.

Li et al., A perspective on paper-based microfluidics: Current status and future trends, Biomicrofluidics, 6(1), p. 011301 (13 pgs), Mar. 2012.

Li et al., Application of microfluidic devices to proteomics research: identification of trace-level protein digests and affinity capture of target peptides, Molecular & cellular Proteomics, 16(2), pp. 157-168, Feb. 2002.

Li et al., Paper-based microfluidic devices by plasma treatment, Anal. Chem., 80(23), pp. 9131-9134, Nov. 2008.

Li et al.; One-step ultrasensitive detection of microRNAs with loop-mediated isothermal amplification (LAMP); Chem Common; 47(9); pp. 2595-2597; Mar. 2011.

Li et al.; Test structure for characterizing low voltage coplanar EWOD system; IEEE Transaction on Semiconductor Manufacturing; IEEE Service Center; Piscataway, NJ.; 22(1); pp. 88-95; Feb. 4, 2009.

Liana et al.; Recent Advances in Paper-Based Sensors; Sensors; 12(9); p. 11505-11526; Aug. 2012.

Link et al.; Electric Control of Droplets in Microfluidic Devices; Angew Chem Int Ed Engl; 45(16); pp. 2556-2560; Apr. 2006.

Liu et al., Three-dimensional paper microfluidic devices assembled using the principles of origami, JACS, 133(44), pp. 17564-17566, Nov. 2011.

Liu et al.; Attomolar ultrasensitive microRNA detection by DNA-scaffolded silver-nanocluster probe based on isothermal amplification; Anal Chem; 84(12); pp. 5165-5169; Jun. 2012.

Lizardi et al.; Mutation detection and single-molecule counting using isothermal rolling-circle amplification; Nat. Genet.; 19(3); pp. 225-232; Jul. 1998.

Locascio et al.; Surface chemistry in polymer microfluidic systems; in Lab-on-a-Chip; Elsevier Science; 1st Ed.; pp. 65-82; Oct. 2003.

Loeber; Neonatal screening in Europe; the situation in 2004, Journal of Inherited Metabolic Disease, 30(4), pp. 430-438, Aug. 2007.

Lohman et al.; Efficient DNA ligation in DNA-RNA hybrid helices by Chlorella virus DNA ligase; Nucleic Acids Research; 42(3); pp. 1831-1844; Nov. 2013.

Luk et al.; Pluronic Additives: A Solution to Sticky Problems in Digital Microfluidics, Langmuir, 24(12), pp. 6382-6389, Jun. 2008.

Luk et al; A digital microfluidic approach to proteomic sample processing; Analytical Chemistry; 81(11); pp. 4524-4530; Jun. 2009.

Mag et al., Synthesis and selective cleavage of an oligodeoxynucleotide containing a bridged internucleotide 5'-phosphorothioate linkage, Nucleic Acids Res., 19(7), pp. 1437-1441, Apr. 1991.

Mais et al.; A solvent replenishment solution for managing evaporation of biochemical reactions in air-matrix digital microfluidics devices; Lab on a Chip; 15(1); pp. 151-158; Jan. 2015.

Makamba et al.; Surface modification of poly(dimethylsiloxane) microchannels; Electrophoresis; 24(21); pp. 3607-3619; Nov. 2003.

Malloggi et al.; Electrowetting—A versatile tool for controlling microdrop generation, Eur. Phys. J. E, 26(1), pp. 91-96, May 2008.

Mandl et al.; Newborn screening program practices in the United States: notification, research, and consent, Pediatrics, 109(2), pp. 269-273, Feb. 2002.

Maroney et al.; A Rapid, quantitative assay for direct detection of microRNAs and other small RNAs using splinted ligation; RNA; 13(6); pp. 930R936; Jun. 2007.

Maroney et al.; Direct detection of small RNAs using splinted ligation; Nat. Protocols3(2); pp. 279-287; Jan. 2008.

Martinez et al., Simple Telemedicine for Developing Regions: Camera Phones and Paper-Based Microfluidic Devices for Real-Time, Off-Site Diagnosis, Anal. Chem., 80(10), pp. 3699-3707, May 2008.

Martinez et al., Three-dimensional microfluidic devices fabricated in layered paper and tape, PNAS, 105(50), pp. 19606-19611, Dec. 2008.

Martinez et al.; Patterned paper as a platform for inexpensive low-volume portable bioassays, Angewandte Chemie, 46(8), pp. 1318-1320, Feb. 2007.

Martinez-Sanchez et al.; MicroRNA Target Identification—Experimental Approaches; Biology; 2; pp. 189-205; Jan. 2013.

Matern et al.; Reduction of the false-positive rate in newborn screening by implementation of MS/MS-based second-tier tests: the Mayo Clinic experience (2004-2007), Journal of Inherited Metabolic Disease, 30(4), pp. 585-592, Aug. 2007.

Mauney, Thermal Considerations for Surface Mount Layouts, in Texas Instruments Portable Power Supply Design Seminar, 16 pgs., 2006.

MEGA; Heterogenous ion-exchange membranes RALEX; 3 pgs.; retrieved Mar. 1, 2016 from the internet: http://www.mega.cz/heterogenous-ion-exchange-membranes-ralex.html.

Meier et al., The photochemistry of stilbenoid compounds and their role in materials technology, Chem. Int. Ed. Engl., 31(11), pp. 1399-1420, Nov. 1992.

Mellors et al.; Fully Integrated Glass Microfluidic Device for Performing High-Efficiency Capillary Electrophoresis and Electrospray Ionization Mass Spectrometry, Analytical Chemistry, 80(18), pp. 6881-6887 (Author Manuscript, 18 pgs.), Sep. 2008.

Michigan Dept. of Community Health; Specimen collection procedure from Michigan Newborn Screening Program, 37 pgs., (retrieved

(56) References Cited

OTHER PUBLICATIONS

Feb. 9, 2017 online: http://web.archive.org/web/20100715000000*/http://www.michigan.gov/documents/Bloodco2_60773_7. pdf) Jul. 2009.

Miller et al.; A digital microfluidic approach to homogeneous enzyme assays, Anal. Chem., 80(5), pp. 1614-1619, Mar. 2008.

Millington et al.; Digital Microfluidics: A Future Technology in the Newborn Screening Laboratory?, Seminars in Perinatology, 34(2), pp. 163-169 (Author Manuscript, 14 pgs.), Apr. 2010.

Millington et al.; Digital Microfluidics: A novel platform for multiplexed detection of LSDs with potential for newborn screening (conference presentation); Oak Ridge Conference; 15 pgs.; 2009.

Millington et al.; Tandem mass spectrometry: a new method for acylcarnitine profiling with potential for neonatal screening for inborn errors of metabolism, Journal of Inherited Metabolic Disease, 13(3), pp. 321ý324, May 1990.

Millington et al.; The Analysis Of Diagnostic Markers Of Genetic Disorders In Human Blood And Urine Using Tandem Mass Spectrometry With Liquid Secondary Ion Mass Spectrometry, International Journal of Mass Spectrometry, 111, pp. 211-228, Dec. 1991.

Miralles et al.; A Review of Heating and Temperature Control in Microfluidic Systems: Techniques and Applications; Diagnostics; 3; pp. 33-67; Jan. 2013.

Mitchell et al.; Circulating microRNAs as stable blood-based markers for cancer detection; Proc Nat Acad Sci; 105(30); pp. 10513-10518; Jul. 2008.

Moon et al.; An integrated digital microfluidic chip for multiplexed proteomic sample preparation and analysis by MALDI-MS. Lab Chip, 6(9), pp. 1213-1219, Sep. 2006.

Moqadam et al.; The Hunting of Targets: Challenge in miRNA Research; Leukemia; 27(1); pp. 16-23; Jan. 2013.

Mousa et al.; Droplet-scale estrogen assays in breast tissue, blood, and serum, Science Translational Medicine, 1(1), 6 pgs., Oct. 2009.

Murran et al.; Capacitance-based droplet position estimator for digital microfluidic devices; Lab Chip; 12(11); pp. 2053-2059; May 2012.

Nakamura et al.; Simple and accurate determination of CYP2D6 gene copy number by a loop-mediated isothermal amplification method and an electrochemical DNA chip; Clinica Chimica Acta; 411(7-8); pp. 568-573; Apr. 2010.

Nelson et al., Incubated protein reduction and digestion on an EWOD digital microfiuidic chip for MALDI-MS, Analytical Chemistry, 82(23), pp. 9932-9937, Dec. 2010.

Newborn Screening Ontario, The newborn screening ontario unsatisfactory sample indicator (educational resource), 3 pgs., retrieved online: https://www.newbornscreening.on.ca/en/health-care-providers/submitters/report-cards/nso_unsatisatory_sample_indicator_jan_2017, (web address was available to applicant(s) at least as of Jan. 2010).

Ng et al., Digital microfluidic magnetic separation for particle-based immunoassays, Anal. Chem., 84(20), 8805-8812, Oct. 2012.

Nilsson et al.; RNA-templated DNA ligation fortranscript analysis; Nucl. Acid Res.; 29(2); pp. 578-581; Jan. 2001.

Njiru; Loop-Mediated Isothermal Amplification Technology: Towards Point of Care Diagnostics; PLoS; 6(6); pp. e1572 (4 pgs.); Jun. 2012.

Notomi et al.; Loop-mediated isothermal amplification of DNA; Nucleic Acid Research; 28(12); p. e63 (7 pgs.); Jun. 2000.

Okubo et al.; Liquid-liquid extraction for efficient synthesis and separation by utilizing micro spaces. Chemical Engineering Science, 63(16), pp. 4070-4077, Aug. 2008.

Oleschuk et al., Trapping of bead-based reagents within microfluidic systems: On-chip solid-phase extraction and electrochromatography, Analytical Chemistry, 72(3), pp. 585-590, Feb. 2000.

Padilla et al.; Newborn screening in the Asia Pacific region, Journal of Inherited Metabolic Disease, 30(4), pp. 490-506, Aug. 2007.

Paik et al., Coplanar digital microfluidics using standard printed circuit board processes, in Proceedings 9th Int'l Conf Miniaturized Systems for Chemistry and Life Sciences (MicroTAS 2005), Boston, MA, USA, pp. 566-568, Oct. 9-13, 2005.

Paneri et al.; Effect of change in ratio of electrode to total pitch length in EWOD based microfluidic system; InComputer Applications and Industrial Electronics (ICCAIE); 2010 International Conference; pp. 25-28; Dec. 5, 2010.

Parida et al.; Rapid detection and differentiation of Dengue virus serotypes by a real-time reverse transcription-loop-mediated isothermal amplification assay; J Clinical Microbiology; 43(6); pp. 2895-2903; Jun. 2005.

Pauwels et al., Biological-Activity of New 2-5a Analogs, Chemica Scripta, 26(1), pp. 141-145, Mar. 1986.

Peltonen et al.; Printed electrodes on tailored paper enable electrochemical functionalization of paper; TAPPI Nanotechnology Conference; Espoo, Finland; 20 pgs.; Sep. 2010.

Peterschmitt et al.; Reduction of false negative results in screening of newborns for homocystinuria, New England Journal of Medicine, 341(21), 1572-1576, Nov. 1999.

Petersen et al., On-chip electro membrane extraction, Microfluidics and Nanofluidics, 9(4), pp. 881-888, Oct. 2010.

Pitt et al.; Hormone replacement therapy for osteoporosis. Lancet, 335 (8695), p. 978, Apr. 1990.

Pollack et al.; Electrowetting-based actuation of droplets for integrated microfluidics; Lab on a Chip; 2(2); pp. 96-101; May 2002.

Pollack et al.; Electrowetting-based actuation of liquid droplets for microfluidic applications, Appl. Phys. Lett., 77(11), pp. 1725-1726, Sep. 2000.

Provincial Health Services Authority (British Columbia Perinatal Health Program), Perinatal Services BC Neonatal Guideline 9: Newborn Screening, 29 pgs., (retrieved Feb. 9, 2017 online: http://www.perinatalservicesbc.ca/health-professionals/guidelines-standards/newborn) guideline revised: Dec. 2010.

Rahhal et al.; The impact of assay sensitivity in the assessment of diseases and disorders in children. Steroids, 73(13), pp. 1322-1327, Dec. 2008.

Rashad; Clinical applications of tandem mass spectrometry: ten years of diagnosis and screening for inherited metabolic diseases, Journal of Chromatography B: Biomedical Sciences and Applications, 758(1), pp. 27-48, Jul. 2001.

Rashed et al.; Diagnosis of inborn errors of metabolism from blood spots by acylcarnitines and amino acids profiling using automated electrospray tandem mass spectrometry, Pediatric Research, 38(3), 324-331, Sep. 1995.

Rawls, Optimistic About Antisense: Promising clinical results and chemical strategies for further improvements delight antisense drug researchers; Chemical & Engineering News; 75(22); pp. 35-39; Jun. 2, 1997.

Ren et al., Automated on-chip droplet dispensing with volume control by electro-wetting actuation and capacitance metering, Sens. Actuator B Chem., 98(2-3), pp. 319-327, Mar. 2004.

Ren et al.; Design and testing of an interpolating mixing architecture for electrowetting-based droplet-on-chip chemical dilution; 12th International Conference on Transducers, Solid-State Sensors, Actuators and Microsystems; vol. 2; Boston, MA, USA; pp. 619-622; Jun. 8-12, 2003.

Ro et al.; Poly (dimethylsiloxane) microchip for precolumn reaction and micellar electrokinetic chromatography of biogenic amines, Electrophoresis, 23(7-8), pp. 1129-1137, Apr. 2002.

Roman et al.; Fully integrated microfluidic separations systems for biochemical analysis, J. Chromatogr. A, 1168(1-2), pp. 170-188, Oct. 2007.

Roman et al.; Sampling and Electrophoretic Analysis of Segmented Flow Streams in a Microfluidic Device, Anal. Chem., 80(21), pp. 8231-8238 (author manuscript, 19 pgs.), Nov. 2008.

Sabourin et al.; Interconnection blocks: a method for providing reusable, rapid, multiple, aligned and planar microfluidic interconnections; Journal of Micromechanics and Microengineering; 19(3); 10 pages; doi:10.1088/0960-1317/19/3/035021; Feb. 18, 2009.

Sadeghi et al.; On Chip Droplet Characterization: A Practical, High-Sensitivity Measurement of Droplet Impedance in Digital Microfluidics; Anal. Chem.; 84(4); pp. 1915-1923; Feb. 2012.

Sahai et al.; Newborn screening, Critical Reviews in Clinical Laboratory Sciences, 46(2), pp. 55-82, (online) Mar. 2009.

Samsi et al.; A Digital Microfluidic Electrochemical Immunoassay; Lab On A Chip; 14(3); pp. 547-554; Feb. 2014.

(56) References Cited

OTHER PUBLICATIONS

Sanghvi & Cook (Ed.); Carbohydrate Modifications in Antisense Research; Chapters 2 and 3, American Chemical Society, Washington DC; (207th National Meeting of the American Chemical Society Mar. 13-17, 1994, San Jose, CA); Dec. 1994.

Sanghvi & Cook (Ed.); Carbohydrate Modifications in Antisense Research; Chapters 6 and 7, American Chemical Society, Washington DC; (207th National Meeting of the American Chemical Society Mar. 13-17, 1994, San Jose, CA); Dec. 1994.

Santen et al.; Superiority of gas chromatography/tandem mass spectrometry assay (GC/MS/MS) for estradiol for monitoring of aromatase inhibitor therapy. Steroids. 72(8), pp. 666-671, Jul. 2007.

Sasano et al.; From Endocrinology to Intracrinology. Endocr Pathol, 9(1), pp. 9-20, Spring 1998.

Satoh et al.; Electrowetting-based valve for the control of the capillary flow, J. Appl. Phys., 103(3), 034903, Feb. 2008.

Satoh et al.; On-chip microfluidic transport and mixing using electrowetting and incorporation of sensing functions, Anal. Chem., 77(21), pp. 6857-6863, Nov. 2005.

Sawai et al., Synthesis and properties of oligoadenylic acids containing 2?-5? phosphoramide linkage, Chem. Lett., 13(5), pp. 805-808, May 1984.

Schertzer et al.; Using capacitance measurements in EWOD devices to identify fluid composition and control droplet mixing; Sens. Actuators B; 145(1); pp. 340-347; Mar. 2010.

SCRIVER_Commentary; A Simple Phenylalanine Method For Detecting Phenylketonuria In Large Populations Of Newborn Infants by Guthrie et al., Pediatrics, 32(3), 338-343, Sep. 1963.

Shah et al., On-demand droplet loading for automated organic chemistry on digital microfluidics, Lab Chip, 13(14), pp. 2785-2795, Jul. 2013.

Shamsi et al; A digital microfluidic electrochemical immunoassay; Lab on a Chip; 14(3); pp. 547-554; (year of pub. sufficiently earlier than effective US filing date and any foreign priority date) 2014.

Shih et al., A feedback control system for high-fidelity digital microfluidics, Lab Chip, 11(3), pp. 535-540, Feb. 2011.

Simpson et al.; Estrogen—the Good, the Bad, and the Unexpected. Endocr Rev, 26(3), pp. 322-330; May 2005.

Sinha et al., A Versatile Automated Platform for Micro-scale Cell Stimulation Experiments, J. Vis. Exp., e50597, 8 pgs., Aug. 2013.

Sinton et al.; Electroosmotic velocity profiles in microchannels, Colloids Surf. A, 222(1-3), pp. 273-283, Jul. 2003.

Skendzel, Rubella immunity: Defining the level of protective antibody, Am. J. Clin. Pathol., 106(2), 170-174, Aug. 1996.

Smith et al; Diagnosis and Management of Female Infertility. Journal of the American Medical Association 290(13), pp. 1767-1770, Oct. 2003.

Sooknanan et al., Nucleic Acid Sequence-Based Amplification, Ch. 12; Molecular Methods for Virus Detection (1st Ed.), Academic Press, Inc., pp. 261-285; Jan. 1995.

Sprinzl et al., Enzymatic incorporation of ATP and CTP analogues into the 3' end of tRNA, Eur. J. Biochem., 81(3), pp. 579-589, Dec. 1977.

Srinivasan et al.; An integrated digital microfluidic lab-on-a-chip for clinical diagnostics on human physiological fluids, Lab Chip, 4(4), pp. 310-315, Aug. 2004.

Stanczyk et al.; Standardization of Steroid Hormone Assays Why, How, and When?, Cancer Epidemiol Biomarkers Prev, 16(9), pp. 1713-1719, Sep. 2007.

Steckl et al.; Flexible Electrowetting And Electrowetting On Flexible Substrates; Proc. SPIE 7956; Advances in Display Technologies; and E-papers and Flexible Displays; 795607 (6 pgs.); Feb. 2011.

Stegink et al.; Plasma amino acid concentrations and amino acid ratios in normal adults and adults heterozygous for phenylketonuria ingesting a hamburger and milk shake meal, American Journal of Clinical Nutrition, 53(3), pp. 670-675, Mar. 1991.

Sun et al.; Rapid and direct microRNA quantification by an enzymatic luminescence assay; (author manuscript; 17 pgs.) Analytical Biochemistry; 429(1); pp. 11-17; Oct. 2012.

Svoboda et al.; Cation exchange membrane integrated into a microfluidic device; Microelectronic Engineering; 86; pp. 1371-1374; Apr.-Jun. 2009.

Szarewski et al.; Contraception. Current state of the art. British Medical Journal, 302(6787), pp. 1224-1226, May 1991.

Szymczak et al.; Concentration of Sex Steroids in Adipose Tissue after Menopause. Steroids, 63(5-6), pp. 319-321, May/Jun. 1998.

Tachibana et al.; Application of an enzyme chip to the microquantification of L-phenylalanine, Analytical Biochemistry, 359(1), pp. 72-78, Dec. 2006.

Tan et al.; A lab-on-a-chip for detection of nerve agent sarin in blood; Lab Chip; 8(6); pp. 885-891; Jun. 2008.

Teh et al.; Droplet microfluidics, Lab Chip, 8(2), pp. 198-220, Feb. 2008.

Therrell et al.; Newborn screening in North America, Journal of Inherited Metabolic Disease, 30(4), pp. 447-465, Aug. 2007.

Tian et al., Printed two-dimensional micro-zone plates for chemical analysis and ELISA, Lab on a Chip, 11(17), pp. 2869-2875, Sep. 2011.

Tobjörk et al., IR-sintering of ink-jet printed metal-nanoparticles on paper, Thin Solid Films, 520(7), pp. 2949-2955, Jan. 2012.

Tomita et al.; Loop-mediated isothermal amplification (LAMP) of gene sequences and simple visual detection of products; Nature Protocols; 3(5); pp. 877-882; (online) Apr. 2008.

Turgeon et al.; Combined Newborn Screening for Succinylacetone, Amino Acids, and Acylcarnitines in Dried Blood Spots, Clinical Chemistry, 54(4), pp. 657-664, Apr. 2008.

Udenfriend et al.; Fluorescamine: a reagent for assay of amino acids, peptides, proteins, and primary amines in the picomole range, Science, 178(4063), pp. 871-872, Nov. 1972.

Unger et al.; Monolithic microfabricated valves and pumps by multilayer soft lithography, Science, 288(5463), pp. 113-116, Apr. 2000.

Univ. of Maryland—Baltimore Washington Medical Center; Plasma amino acids, 6 pgs., retrieved Feb. 10, 2017 from: http://www.mybwmc.org/library/1/003361, Web address available to applicant(s) at least as of Jan. 2010.

Verkman; Drug Discovery In Academia; Am J Physiol Cell Physiol; 286(3); pp. C465-C474; Feb. 2004.

Walker et al.; A Chemiluminescent DNA Probe Test Based on Strand Displacement Amplification (Chapter 15); Molecular Methods for Virus Detection (1st Ed.), Academic Press, Inc., pp. 329-349; Jan. 1995.

Walker et al.; A passive pumping method for microfluidic devices, Lab Chip, 2(3), pp. 131-134, Aug. 2002.

Wang et al., Paper-based chemiluminescence ELISA: lab-on-paper based on chitosan modified paper device and, Biosens. Bioelectron., 31(1), pp. 212-218, Jan. 2012.

Wang et al., Simple and covalent fabrication of a paper device and its application in sensitive chemiluminescence immunoassay, Analyst, 137(16), pp. 3821-3827, Aug. 2012.

Wang et al.; Highly sensitive detection of microRNAs based on isothermal exponential amplification-assisted generation of catalytic G-quadruplexDNAzyme; Biosensors and Bioelectronics, 42; pp. 131-135; Apr. 2013.

Washburn et al.; Large-scale analysis of the yeast proteome by multidimensional protein identification technology, Nat. Biotechnol., 19(3), pp. 242-247, Mar. 2001.

Watson et al.; Multilayer hybrid microfluidics: a digital-to-channel interface for sample processing and separations; Anal. Chem.; 82(15); pp. 6680-6686; Aug. 2010.

Wheeler et al.; Electrowetting-Based Microfluidics for Analysis of Peptides and Proteins by Matrix-Assisted Laser Desorption/Ionization Mass Spectrometry; Anal Chem; 76(16); pp. 4833-4838; Aug. 2004.

Wheeler; Chemistry. Putting electrowetting to work; Science; 322(5901); pp. 539-540; Oct. 2008.

Wu et al.; Design, Simulation and Fabrication of Electrowetting-Based Actuators for Integrated Digital Microfluidics; Proceedings of the 1st IEEE International Conference on Nano/Micro Engineered and Molecular Systems; Zhuhai, China; pp. 1097-1100; Jan. 18-21, 2006.

(56) References Cited

OTHER PUBLICATIONS

Wu et al.; Electrophoretic separations on microfluidic chips, J. Chromatogr. A, 1184(1-2), pp. 542-559, Mar. 2008.
Yan et al., A microfluidic origami electrochemiluminescence aptamer-device based on a porous Au-paper electrode and a phenyleneethynylene derivative, Chem. Common. (Camb), 49(14), pp. 1383-1385, Feb. 2013.
Yan et al., Paper-based electrochemiluminescent 3D immunodevice for lab-on-paper, specific, and sensitive point-of-care testing, Chem.—Eur. J., 18(16), pp. 4938-4945, Apr. 2012.
Yi et al.; Spangler et al., Eds; Channel-to-droplet extractions for on-chip sample preparation, in Proceedings of Solid-State Sensor, Actuator and Microsystems Workshop, pp. 128-131, Jun. 2006.
Yin et al.; One-step, multiplexed fluorescence detection of microRNAs based on duplex-specific nuclease signal amplification; J. American Chem. Soc.; 134(11); pp. 5064-5067; Mar. 2012.
Yoon et al.; Preventing Biomolecular Adsorption in Electrowetting-Based Biofluidic Chips; Anal Chem; 75; pp. 5097-5102; Aug. 2003.
Yoon; Open-Surface Digital Microfluidics; The Open Biotechnology Journal; 2 (1); pp. 94-100; Apr. 2008.
Young et al.; Calculation of DEP and EWOD Forces for Application in Digital Microfluidics, J. Fluids Eng., 130(8), pp. 081603-1-081603-9, Jul. 2008.
Yu et al.; Microfabrication of a digital microfluidic platform integrated with an on-chip electrochemical cell; Journal of Micromechanics and Microrngineering; 23(9); pp. 10 pages; doi: 10.1088/0960-1317/23/9/095025; Aug. 2013.
Yu et al., Monolithic porous polymer for on-chip solid-phase extraction and preconcentration prepared by photoinitiated in situ polymerization within a microfluidic device, Analytical Chemistry, 73(21), pp. 5088-5096, Nov. 2001.
Yu et al.; Parallel-plate lab-on-chip electrochemical analysis; Journal of Micromechanics and Microengineering; 24(1); 7 pages; doi: 10.1088/0960-1317/24/1/015020; Dec. 16, 2013.
Yu et al., Preparation of monolithic polymers with controlled porous properties for microfluidic chip applications using photoinitiated free-radical polymerization, Journal of Polymer Science, Part A: Polymer Chemistry, 40(6), pp. 755-769, Mar. 2002.
Yu et al.; A plate reader-compatible microchannel array for cell biology assays; Lab Chip; 7(3); pp. 388-391; Mar. 2007.
Yu et al.; Microfabtrication of a digital microfluidic platform integrated with an on-chip electrochemical cell; Journal of Micromechanics and Microengineering; 23(9); doi:10.1088/0960-1317/23/9/095025, 10 pages; Aug. 28, 2013.
Zaffanello et al.; Multiple positive results during a neonatal screening program: a retrospective analysis of incidence, clinical implications and outcomes, Journal of Perinatal Medicine, 33(3), pp. 246-251, May 2005.
Zhang et al.; Multiplexed detection of microRNAs by tuning DNA-scaffolded silver nanoclusters; Analyst; 138(17); pp. 4812-4817; Sep. 2013.
Zhao et al., Lab on Paper, Lab Chip, 8(12), pp. 1988-1991, Dec. 2008.
Znidarsic-Plazl et al.; Steroid extraction in a microchannel system—mathematical modelling and experiments. Lab Chip, 7(7), pp. 883-889, Jul. 2007.
Zuker; Mfold Web Server for Nucleic Acid Folding and Hybridization Prediction; Nucleic Acid Research ; 31(13); pp. 3406-3415; Jul. 2003.
Zytkovicz et al.; Tandem mass spectrometric analysis for amino, organic, and fatty acid disorders in newborn dried blood spots: a two-year summary from the New England Newborn Screening Program, Clinical Chemistry, 47(11), pp. 1945-1955, Nov. 2001.
Fobel et al.; U.S. Appl. No. 15/457,930 entitled "Printed Digital Microfluidic Devices Methods Of Use And Manufacture Thereof", filed Mar. 13, 2017.
Baxendale et al.; Multistep synthesis using modular flow reactors: bestmann-ohira reagent for the formation of alkynes and triazoles; Angewandle Chemie International Edition; 48(22); pp. 4017-4021; May 2009.
Chen et al.; The chemistrode: a droplet-based microfluidic device for stimulation and recording with high temporal, spatial, and chemical resolution; Proceedings of the National Academy of Sciences; 105(44); pp. 16843-16848; Nov. 2004.
Cottam et al.; Accelerated synthesis of titanium oxide nanostructures using microfluidic chips; Lab on a Chip; 7(2); pp. 167-169; Feb. 2007.
Doebler et al.; Continuous-flow, rapid lysis devices for biodefense nucleic acid diagnostic systems; Journal of the Association for Laboratory Automation; 14(3); pp. 119-125; Jun. 2009.
Fan et al.; Integrated barcode chips for rapid, multiplexed analysis of proteins in microliter quanties of blood; Nature Biotechnology; 26(12); pp. 1373-1378; 15 pages (Author Manuscript); Dec. 2008.
Hennequin et al.; Synthesizing microcapsules with controlled geometrical and mechanical properties with microfluidic double emulsion technology: Langmuir; 25(14); pp. 7857-7861; Jul. 2009.
Koster et al.; Drop-based microfluidic devices for encapsulation of single cells; Lab on a Chip; 8(7); pp. 1110-1115; Jul. 2008.
Marre et al.; Synthesis of micro and nanostructures in microfluidic systems; Chemical Society Reviews; 39(3); pp. 1183-1202; Mar. 2010.
Theberge et al.; Microdroplets in microfluidics: an evolving plarform for discoveries in chemistry and biology; Angewandte Chemie International Edition; 49(34); pp. 5846-5868; Aug. 2010.
Torkkeli; Droplet microfluidics on a planar surface; VTT Technical Research Centre of Finland; Publications 504; 214 pages (Dissertation); Oct. 2003.
Wang et al.; An integrated microfluidic device for large-scale in situ click chemistry screening; Lab on a Chip; 9(16); 9(16); pp. 2281-2285; 9 pages (Author Manuscript); Aug. 2009.
Wlodkowic et al.; Tumors on chips: oncology meets microfluidics; Current opinion in Chemical Biology; 14(5); pp. 556-567; Oct. 2010.
Yung et al.; Micromagnetic-microfluidic blood cleansing devices; Lab on a Chip; 9(9); pp. 1171-1177; May 2009.
Yue; Undergraduate Chemistry experiment (II); Hunan Normal University Press; First Edition; p. 96; (Machine Translation included); Oct. 2008.
Zhang et al.; The permeability characteristics of silicone rubber; In Proceedings of 2006 SAMPE Fall Technical Conference; 10 pages; Nov. 6, 2006.
Kim et al.; Automated digital microfluidic sample preparation for next-generation DNA sequencing; JALA; Journal of the Association for Laboratory Automation; 16(6); pp. 405-414; Dec. 2011.
Jebrail et al.; U.S. Appl. No. 16/915,835 entitled "Evaporation management in digital microfluidic devices," filed Jun. 29, 2020.
Jebrail et al.; U.S. Appl. No. 17/088,572 entitled "Control of evaporation in digital microfluidics," filed Nov. 3, 2020.
Boles et al.;Droplet-Based Pyrosequencing Using Digital Microfluidics; Analytical Chemistry; 83(22); pp. 8439-8447; Oct. 14, 2011.
Dambrot; Of microchemistry and molecules: Electronic microfluidic device synthesizes biocompatible probes; 4 pages, retrieved from the internet (https://phys.org/news/2012-01-microchemistry-molecules-electronic-microfluidic-device.html); Jan. 26, 2012.
Dixon et al.; An inkjet printed, roll-coated digital microfluidic device for inexpensive, miniaturized diagnostic assays; Lab on a Chip; 16(23); pp. 4560-4568; Nov. 2016.
Faure et al.; Improved electrochemical detection of a transthyretin synthetic peptide in the nanomolar range with a two-electrode system integrated in a glass/PDMS microchip; Lab on a Chip; 14(15); pp. 2800-2805, Aug. 2014.
Tang et al.; Mechano-regulated surface for manipulating liquid droplets; Nature Communications; 10 pages; DOI: 10.1038/ncomms14831; ; Apr. 4, 2017.
Jebrail et al.; U.S. Appl. No. 16/523,876 entitled "Air-matrix digital microfluidics apparatuses and methods for limiting evaporation and surface fouling," filed Jul. 26, 2019.
Jebrail et al.; U.S. Appl. No. 16/499,681 entitled Digital microfluidics apparatuses and methods for manipulating and processing encapsulated droplets, filed Sep. 30, 2019.

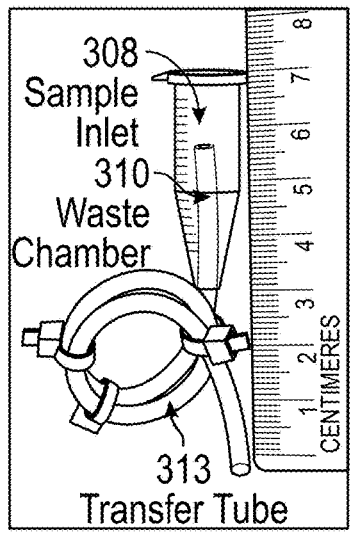 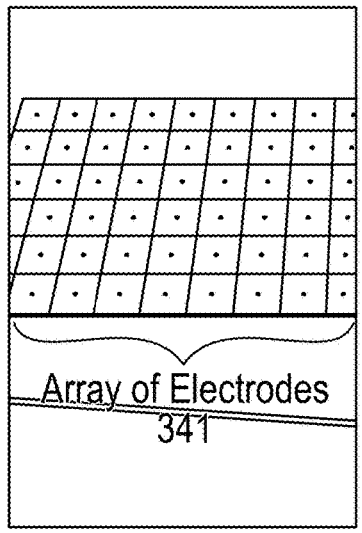 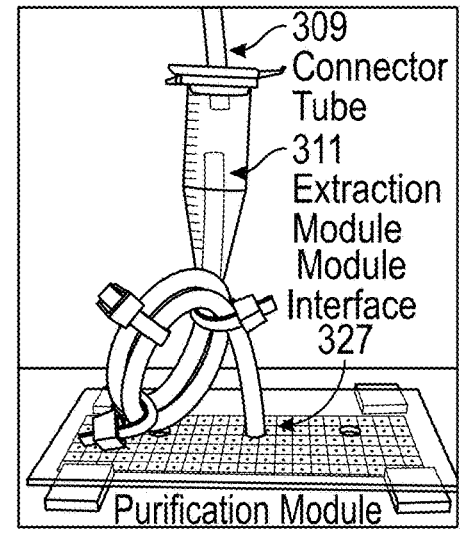
FIG. 1A  FIG. 1B  FIG. 1C
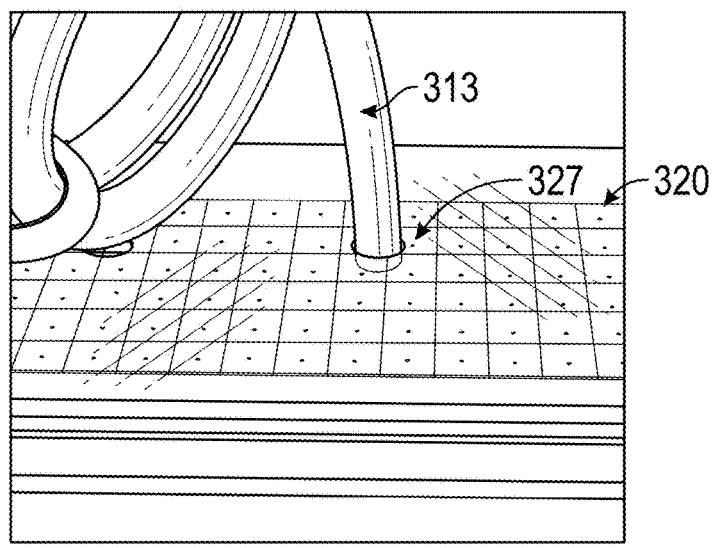
FIG. 2

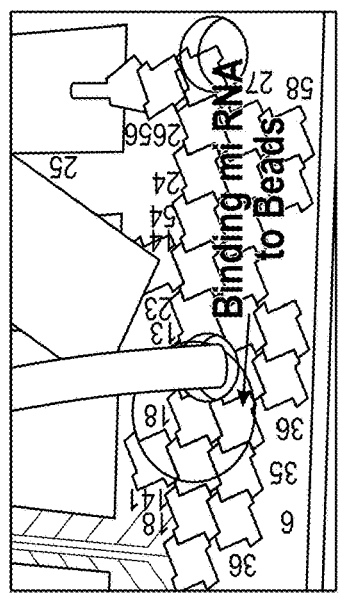
FIG. 4A
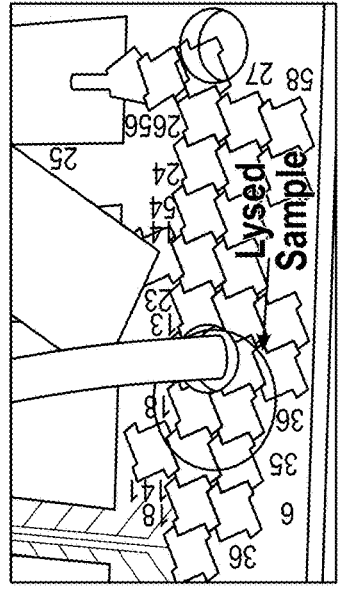
FIG. 4B
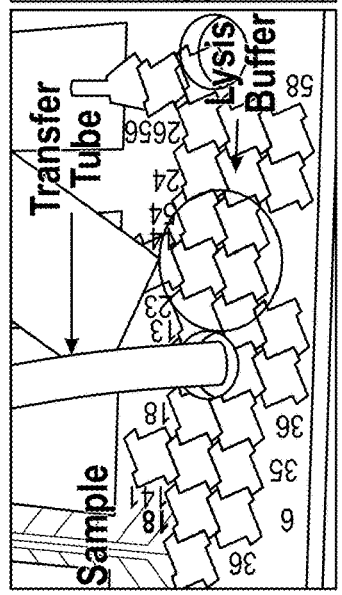
FIG. 4C
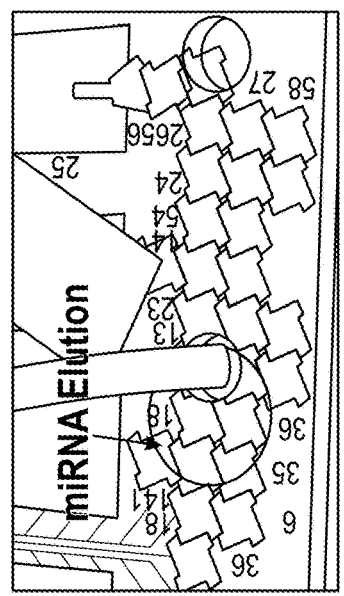
FIG. 4D
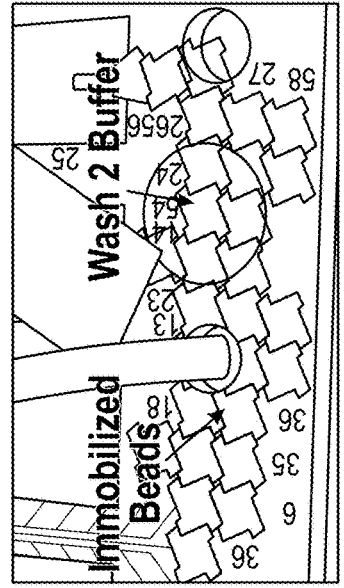
FIG. 4E
FIG. 4F

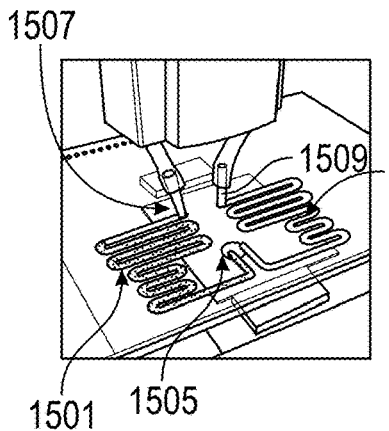
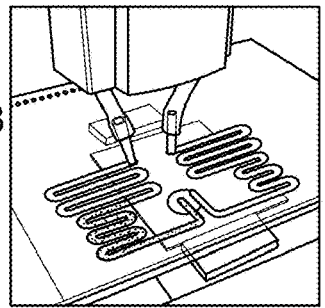
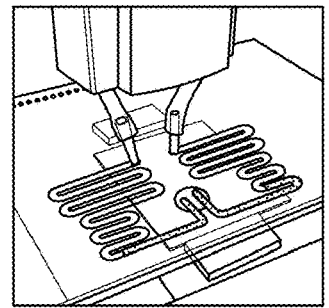
FIG. 15A  FIG. 15B  FIG. 15C
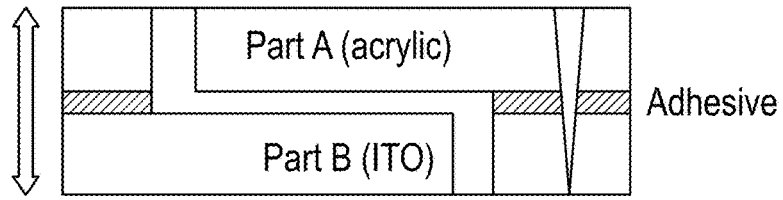
FIG. 16A
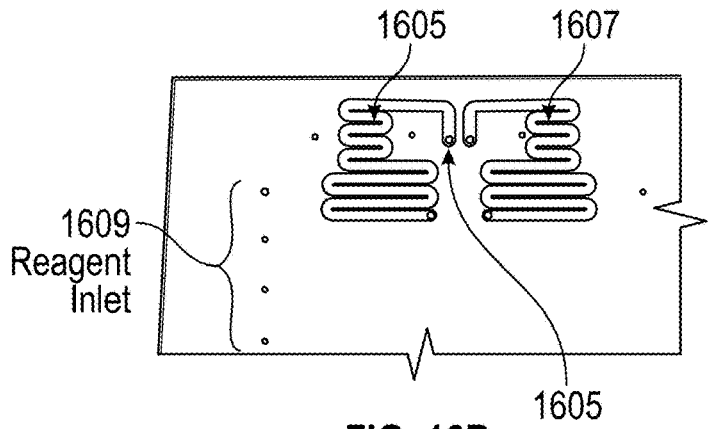
FIG. 16B
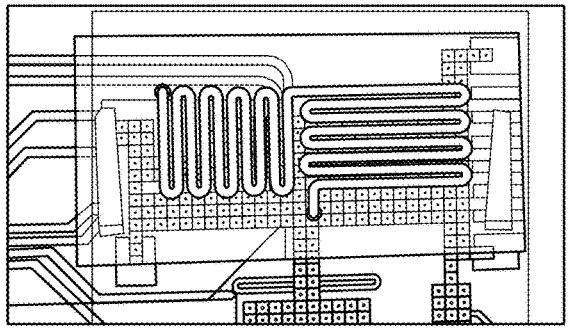
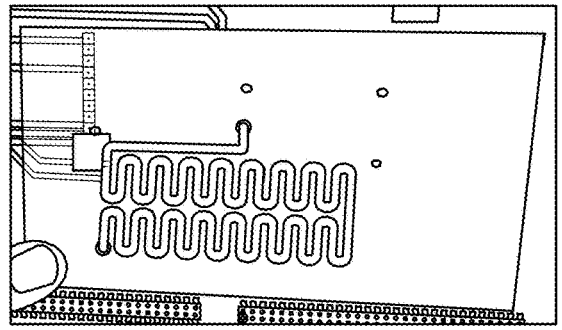
FIG. 16C  FIG. 16D

ND METHODS

DIGITAL MICROFLUIDIC DEVICES AND METHODS

CROSS REFERENCE TO RELATED APPLICATIONS

This patent application is a continuation of International Patent Application No. PCT/US2017/068839, filed Dec. 28, 2017 and titled "DIGITAL MICROFLUIDIC DEVICES AND METHODS." This patent application claims priority to U.S. provisional patent application No. 62/439,641, filed on Dec. 28, 2016 and titled "DIGITAL MICROFLUIDIC DEVICES AND METHODS". This patent application also claims priority to U.S. provisional patent application No. 62/553,743, filed on Sep. 1, 2017, and titled "DIGITAL MICROFLUIDICS DEVICES AND METHODS OF USING THEM." This patent application also claims priority to U.S. provisional patent application No. 62/557,714, filed on Sep. 12, 2017 and titled "DIGITAL MICROFLUIDICS DEVICES AND METHODS OF USING THEM." Each of these patent application is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The disclosure relates to digital microfluidic devices and associated fluid manipulation and extraction devices, and methods of using them.

BACKGROUND

Digital microfluidics (DMF) is a powerful technique for simple and precise manipulation of microscale droplets of fluid. DMF has rapidly become popular for chemical, biological, and medical applications, as it allows straightforward control over multiple reagents (no pumps, valves, or tubing required), facile handling of both solids and liquids (no channels to clog), and compatibility with even troublesome reagents (e.g., organic solvents, corrosive chemicals) because the hydrophobic surface (typically Teflon-coated) is chemically inert. However, a continuing challenge for DMF is handling of "real-world" samples, which typically comprise fluid volumes greater than ones easily accommodated by DMF devices, containing analytes of interest at concentrations too dilute to support downstream processing and detection without prior concentration. Some groups have demonstrated that droplets can be dispensed onto DMF devices from large volumes (hundreds of microliters to milliliters) contained in off-device reservoirs; this only partially addresses the challenge, however, because on-device processing of hundreds or thousands of droplets to collect enough analyte for further manipulation is often not a realistic strategy. Off-device concentration prior to introduction into the DMF device can be a good solution for reagents, because generally they are prepared in large batches for use in hundreds or thousands of reactions. However, off-device concentration of sample analytes must be carried out independently for each sample, necessitating considerable manual labor (or a robotic system) and risking contamination of, and worker exposure to, the samples.

In answer to this challenge, we have developed a novel interface in which an integrated companion module repeatedly drives the entirety of a large-volume sample on the DMF device, enabling analytes onto the device. To demonstrate the utility of this system, microRNA (miRNA) was extracted from human plasma and further purified in in the DMF device itself. The system is designed for facile reconfiguration and reprogramming, for accommodation of a wide variety of sample types and volumes.

SUMMARY OF THE DISCLOSURE

In general, described herein are methods and apparatuses including devices, systems, etc. for obtaining, preparing, manipulating and analyzing a sample. For example, described herein are digital microfluidic (DMF) devices, fluid application and extraction devices, and methods of using them that may be especially helpful for handling and analyzing a clinical, laboratory, biological, or chemical sample. The methods and apparatuses may be especially useful for handling relatively larger volumes of fluid. The apparatuses, devices, systems, and methods may be used with a sample containing any concentration of an analyte but may be especially useful for handling and analyzing relatively dilute samples (e.g., without requiring prior sample concentration). The DMF apparatuses, systems, devices, and methods described herein may be used with the fluid application and extraction devices and methods described herein or may be used alone or with other devices such as other fluid application and extraction devices. Likewise, the fluid application and extraction devices and methods described herein may be used with the DMF apparatus, systems devices, and methods described herein or may be used alone or with other devices such as other DMF devices. The apparatus, devices, systems, and methods described herein generally involve manipulation of discrete samples of liquids (drops/droplets). In some aspects, circuits are utilized for creating and transporting the liquids (drops/droplets). In some other aspects a controllable pressure source (e.g., a pump) is utilized to selectively apply positive or negative pressure to move discrete samples of liquids through the apparatus, devices, systems, etc. The controllable pressure source may also be utilized for effective sample mixing, even of large volumes of fluids. The apparatus, devices and methods described herein may be used at any stage of analyte enrichment, transportation, reaction, or analysis, such as for extracting an analyte from a sample (e.g., a cell sample, a tissue sample including a blood or plasma sample, a biopsy sample, a bacteria, a yeast, a saliva sample, a swab, etc.), enriching for or purifying or partially purifying an analyte from a sample such as an RNA, DNA, protein (including antibodies), small chemical, small organic molecule, drugs, etc. analyte, performing other hybridization reactions such as RNA-DNA, RNA-RNA, antibody-DNA hybridizations; performing some or all of the steps in other analyses such as PCR, enzymatic protein analyses, immunoassays, DNA sequencing, The apparatuses described herein may provide a fluid application and extraction interface device for a digital microfluidics (DMF) apparatus, the device including: a waste reservoir comprising a fluid trap, wherein the fluid trap comprises a sample inlet extending above a waste chamber when the device is held upright; an opening through the waste reservoir above the sample inlet when the device is held upright; and a transfer conduit extending through the waste reservoir, wherein the sample inlet opens into the transfer conduit at a proximal end of the sample inlet so that fluid may pass from the transfer conduit into the waste reservoir and be trapped within the waste chamber; wherein the transfer conduit is configured to couple to the DMF apparatus at a distal end of the transfer conduit.

These apparatuses may provide a fluid application and extraction interface device for a digital microfluidics apparatus, the device comprising: a waste reservoir comprising a fluid trap, wherein the fluid trap comprises a sample inlet extending above a waste chamber when the device is held upright; an opening through the waste reservoir above the sample inlet when the device is held upright; a connector conduit coupled to the opening; and a transfer conduit extending through the waste reservoir, wherein the sample inlet opens into the transfer conduit at a proximal end of the sample inlet so that fluid may pass from the transfer conduit into the waste reservoir and be trapped within the waste chamber; wherein the transfer conduit is configured to couple to the digital microfluidics apparatus at a distal end of the transfer conduit and wherein the transfer conduit doubles back on itself two or more times between the waste reservoir and the distal end of the transfer conduit.

Some of these fluid application and extraction interface devices further provide a coupling on the DMF apparatus configured to couple with the transfer conduit.

In some of these fluid application and extraction interface devices the transfer conduit doubles back on itself two or more times between the waste reservoir and the distal end of the transfer conduit.

In some of these fluid application and extraction interface devices the transfer conduit includes one or more loops between the waste reservoir and the distal end of the transfer conduit.

Some of these fluid application and extraction interface devices further provide a connector conduit coupled to the opening through the waste reservoir above the sample inlet.

Some of these fluid application and extraction interface devices further provide a controllable pressure source coupled to either the connector conduit or the transfer conduit and to selectively apply positive or negative pressure in the transfer conduit.

Some of these fluid application and extraction interface devices further provide a peristaltic pump coupled to either the connector conduit or the or the transfer conduit to selectively apply positive or negative pressure in the transfer conduit.

In some of these fluid application and extraction interface devices the waste reservoir comprises a tube having a volume of between 0.5 ml and 50 ml.

In some of these fluid application and extraction interface devices the volume of the waste chamber is between 0.4 and 50 ml.

In some of these fluid application and extraction interface devices the transfer conduit extends through a base of the waste reservoir.

In some of these fluid application and extraction interface devices the inner diameter of the transfer conduit is between about 0.5 mm ID and 5 mm.

In some of these fluid application and extraction interface devices the transfer conduit includes tubing.

The apparatuses described herein may provide a digital microfluidics (DMF) apparatus configured to handle large sample volumes, the device including: a first plate having a first hydrophobic layer; a second plate having a second hydrophobic layer; a gap formed between the first and second hydrophobic layers, wherein the distance between the first plate and the second plate is 1 mm or greater; a plurality of actuation electrodes arranged in a first plane adjacent to the first hydrophobic layer; a fluid application and extraction interface device configured to apply or remove fluid into the gap, the fluid application and extraction interface device including: a waste reservoir comprising a fluid trap, wherein the fluid trap comprises a sample inlet extending above a waste chamber; an opening through the waste reservoir above the sample inlet; and a transfer conduit extending through the waste reservoir, wherein the sample inlet opens into the transfer conduit at a proximal end of the sample inlet so that fluid may pass from the transfer conduit into the waste reservoir and be trapped within the waste chamber; wherein a distal end of the transfer conduit is coupled to an opening on one of: the first plate, the second plate or between the first and second plates.

In some of these digital microfluidics (DMF) apparatus configured to handle large sample volumes the transfer conduit doubles back on itself two or more times between the waste reservoir and the distal end of the transfer conduit.

In some of these digital microfluidics (DMF) apparatus configured to handle large sample volumes the transfer conduit comprises one or more loops between the waste reservoir and the distal end of the transfer conduit.

Some of these digital microfluidics (DMF) apparatus configured to handle large sample volumes further include a connector conduit coupled to the opening through the waste reservoir above the sample inlet.

Some of these digital microfluidics (DMF) apparatus configured to handle large sample volumes further include a controllable pressure source to selectively apply positive or negative pressure in the transfer conduit, wherein the controllable pressure source is coupled to either: a connector conduit connected to the opening through the waste reservoir above the sample inlet; or the transfer conduit.

Some of these digital microfluidics (DMF) apparatus configured to handle large sample volumes further include a peristaltic pump configured to selectively apply positive or negative pressure in the transfer conduit.

In some of these digital microfluidics (DMF) apparatus configured to handle large sample volumes the waste reservoir comprises a tube having a volume between 0.4 ml and 50 ml.

In some of these digital microfluidics (DMF) apparatus configured to handle large sample volumes the volume of the waste chamber is between 0.4 and 50 ml.

In some of these digital microfluidics (DMF) apparatus configured to handle large sample volumes the transfer conduit extends through a base of the waste reservoir.

In some of these digital microfluidics (DMF) apparatus configured to handle large sample volumes the inner diameter of the transfer conduit is between about 0.5 mm ID and 5 mm.

In some of these digital microfluidics (DMF) apparatus configured to handle large sample volumes the transfer conduit comprises tubing.

Another aspect of the invention provides a method of selectively removing large volumes of fluid from a digital microfluidic (DMF) apparatus, the method comprising: moving a fluid between a first plate and a second plate of the DMF apparatus to a fluid extraction region, wherein the first plate and the second plate are separated by a first gap of 1 mm or more, and wherein the first plate comprises a plurality of actuation electrodes; applying negative pressure to a transfer conduit coupled to the fluid extraction region either between the first plate and the second plate of the DMF apparatus or to an opening through the first plate or the second plate of the DMF apparatus; drawing all or a portion of the fluid into the transfer conduit, through the transfer conduit along an inverting path that doubles back on itself two or more times, out of a sample inlet of a fluid trap, and into a waste chamber below the sample inlet; and applying energy to a subset of the plurality of actuation electrodes to move a droplet from between the first gap to a second gap between the first plate and a second plate that are separated by a distance that is less than 1 mm.

The apparatuses described herein may provide an air-matrix digital microfluidic (DMF) apparatus including: a first plate having a first hydrophobic layer; a second plate having a second hydrophobic layer; a third plate having a third hydrophobic layer; a first air gap formed between the first and third hydrophobic layers, wherein the first gap is greater than 1 mm; a second air gap formed between the first and second hydrophobic layers, wherein the second air is 1 mm or less and wherein the first and second air gaps are continuous and the second and third plates overlap with each other; a plurality of actuation electrodes adjacent to the first hydrophobic layer extending from the first air gap to the second air gap; and a fluid extraction region in the first air gap.

Any of the apparatuses and method described herein may be configured as cartridges for use with a DMF apparatus. For example, the apparatuses described herein may be configured as a cartridge for a digital microfluidics (DMF) apparatus, the cartridge having a bottom and a top, the cartridge comprising: a first dielectric layer; a first hydrophobic layer on first dielectric layer; a top plate having first side and a second side; a ground electrode on first side of the top plate; a second hydrophobic layer on the first side of the top plate covering the ground electrode; an air gap separating the first hydrophobic layer and the second hydrophobic layer; a first sample compartment and a second sample compartment, wherein the first and second sample compartments are on the second side of the top plate; a first opening between the first sample compartment and the air gap and a second opening between the second sample compartment and the air gap, wherein the first and second openings are adjacent to each other within about 4 cm or less (e.g., 3 cm or less, 2 cm or less, 1.5 cm or less, 1 cm or less, etc.); a first inlet for a first pump connection in communication with the first sample compartment; and a second inlet for a second pump connection in communication with the second sample compartment.

For example, a cartridge for a digital microfluidics (DMF) apparatus, the cartridge having a bottom and a top, may include: a sheet of dielectric material having a first side and a second side, the first side forming an exposed bottom surface on the bottom of the cartridge; a first hydrophobic layer on the second side of the sheet of dielectric material; a top plate having first side and a second side; a ground electrode on first side of the top plate; a second hydrophobic layer on the first side of the top plate over the ground electrode; an air gap separating the first hydrophobic layer and the second hydrophobic layer, wherein the air gap comprises a separation of greater than 500 micrometers; a first sample compartment and a second sample compartment, wherein the first and second sample compartments are on the second side of the top plate; a first opening between the first sample compartment and the air gap and a second opening between the second sample compartment and the air gap, wherein the first and second openings are adjacent to each other within a distance of about 2 cm or less; a first inlet for a first pump connection in communication with the first sample compartment; and a second inlet for a second pump connection in communication with the second sample compartment.

A cartridge for a digital microfluidics (DMF) apparatus may comprise: a bottom dielectric layer; a top plate having first side and a second side; a ground electrode on first side of the top plate; an air gap between the bottom dielectric layer and the ground electrode; a first sample compartment and a second sample compartment, wherein the first and second sample compartments are on the second side of the top plate; a first opening between the first sample compartment and the air gap and a second opening between the second sample compartment and the air gap, wherein the first and second openings are adjacent to each other within about 5 cm or less (e.g., about 4 cm or less, about 3 cm or less, about 2 cm or less, about 1.5 cm or less, about 1 cm or less, etc.); a first inlet for a first pump connection in communication with the first sample compartment; and a second inlet for a second pump connection in communication with the second sample compartment.

In any of these apparatuses, the first dielectric layer may comprise a sheet of dielectric material having a first side and a second side, the first side forming an exposed bottom surface on the bottom of the cartridge, wherein the first hydrophobic layer is on the second side. The sheet of dielectric material may be flexible, and may be suctioned onto the reader (the reader may include the electrodes to drive movement of droplet(s) within the air gap). The bottom of the cartridge may be formed by a first side of the sheet of dielectric material.

The air gap separating the first hydrophobic layer and the second hydrophobic layer may be separated by any appropriate distance (on average, or at most), for example, the air gap may have an average separation of greater than 500 micrometers. This may allow for large-volume droplets within the cartridge.

The sample compartments may be formed in the top plate (e.g., cut into the plate) or attached to the top plate. The first and second sample compartments may typically extend along the second side of the top plate. Any of these apparatuses may include a top cover covering the first sample compartment, wherein the first inlet is coupled to the top cover. The same top plate or a separate top plate may cover the second sample compartment, and may also include a second inlet.

Any of these cartridges may include a first microfluidics channel connected to the first sample compartment and a second microfluidics channel connected to the second sample compartment. For example, the first opening between the first sample compartment and the air gap may comprise a first microfluidics channel connected to the first sample compartment; and the second opening between the second sample compartment and the air gap may comprise a second microfluidics channel.

The first and second sample compartments may each be configured to contain more than 1 ml of fluid (e.g., more than 5 ml of fluid, more than 7 ml of fluid, more than 10 ml of fluid, more than 15 ml of fluid, more than 20 ml of fluid, up to 25 mL of fluid, etc.).

The top plate may be a see-through material (e.g., a material that can be imaged through). For example, the top plate may comprise an acrylic material.

The cartridge may include one or more reagent reservoirs on the second side of the top plate. For example, the cartridge may include one or more freeze-dried reagent reservoirs on the second side of the top plate.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 1A-1C show a fluid application and extraction device for use with a digital microfluidics apparatus. FIG. 1A shows a side view of a fluid application and extraction device. FIG. 1B shows a perspective view of a digital microfluidic device having an array of electrodes that can be used with the fluid application and extraction device shown in FIG. 1A. FIG. 1C shows a view of a fluid application and extraction device interfacing with a digital microfluidic device such as the one shown in FIG. 1B.

FIG. 2 shows a close up view of one end of a fluid application and extraction device interfacing with a digital microfluidic device apparatus.

FIGS. 4A-4F shows illustrate one example of extraction and purification of miRNA from a plasma sample using a sample handling system as described herein.

FIG. 7 shows results for miRNA-39. FIG. 8 shows results for miRNA-54.

In FIG. 9, the removable cartridge has been made transparent (a microfluidics region above the top plate, air-gap and dielectric forming the DMF portion of the cartridge has been made transparent). The different regions are indicated by different boxes, and may be distributed in a particular arrangement over the array. For example, in FIG. 9, seven of the electrodes are configured as magnetic regions 605, which can apply a local (to that electrode) magnetic force to retain a magnetic bead or particle within a droplet on the electrode. Eight of the peripheral regions (each spanning six electrodes) are configured as cooling zones, which may be in thermal contact with a Peltier device or other thermal cooling region. In addition, in FIG. 9, six 16-electrode regions on the left side are configured as cooling zones which may also be in thermal contact with the same or different Peltier device (e.g., holding them below 10 degrees C.). Two central heating zones (one spanning five electrodes, the other spanning 32 electrodes) are also included, and may be thermally cycled over the entire zone or over regions of the zone(s). Four optically read zones (each spanning four electrodes) are spaced apart from each other on the right side perimeter of the device. In general, the heating and/or thermally cycling regions are centrally located, apart from the peripheral cooling/storage regions. There may be overlap between the zones, such as the magnetic zones and the heating/cooling zones. FIG. 9 also shows, in a transparent view, a microfluidics portion that may be formed above (and in the top plate, as described) the air gap. For example, in FIG. 9, the microfluidics portion 611 includes a pair of serpentine microfluidics channels 615, 616 that each connect to an opening (which may be regulated by a valve) into the air gap. The microfluidics portion may also include valves. In FIG. 9, the microfluidics channel also includes a pair of ports 617, 618 through which positive and/or negative pressure may be applied to modulate (along with any valves) the movement of fluid in the microfluidics region and (in some variations) into or out of the air gap. The microfluidics portion may also include one or more waste chambers 621.

FIG. 14A is a top perspective view. FIG. 14B is a side view.

FIGS. 15A-15C illustrate one example of a microfluidics channel interfacing with a DMF air gap region as described herein. In FIG. 15A, the microfluidics portion of a cartridge is shown as a pair of channels each connected to an inlet/outlet, and each ending in a bridging region forming an opening into the air gap of the DMF portion of the cartridge (in this example, below the microfluidics portion). Fluid may be removed, added, washed, etc. into/out of the air gap of the DMF portion. In FIGS. 15B and 15C, fluid washed through the bridging droplet and into the air gap by alternating and applying suction between the inlet/outlet, as shown. In this example, external fluidic components (e.g., tubing and reservoirs) are integrated into the top plate of the DMF portion, allowing a compact form factor. The microfluidics channels may be used for adding/removing reagent (e.g., removing waste, washing, etc.). The bridging droplet may be an electrode or group of electrodes and the size of the droplet may be regulated by DMF.

FIG. 16A shows one example of a section through a top plate to form a microfluidics channel immediately adjacent to the DMF portion (e.g., above or below the DMF portion, as part of the top plate). FIG. 16B shows an example of a top plate into which microfluidic channels have been formed.

FIG. 16C is another example of a top plate of a DMF apparatus configured as a microfluidics channel. The top plate is shown as an acrylic material into which channels and holes have been formed (e.g., by milling, cutting, rastering, etc.).

FIG. 16D shows another example of a microfluidics channel formed into a top plate of a DMF portion of a cartridge.

In FIG. 17A, the fluid application and extraction device is connected through the top plate. In FIG. 17B, the fluid application and extraction device is connected from the side plate.

In FIG. 17C, the interface 1127 for the fluid lines, which may be microfluidic channels, including microfluidic channels formed in part by the top plate 1117, interfaces through the top plate, and (unlike FIG. 17A) the air gap in this interface region may be larger than the air gap in other portions of the DMF cartridge. in FIG. 17D, the air gap region is larger than in other regions of the cartridge. In any of the FIGS. 17A-17D, the fluid lines (e.g., 1143, 1145) and reservoirs (1105, 1107) may form part of the DMF apparatus, and may interface with a port on the cartridge, e.g., the top surface of the cartridge, and/or one or more valves.

DETAILED DESCRIPTION

Figure 3:
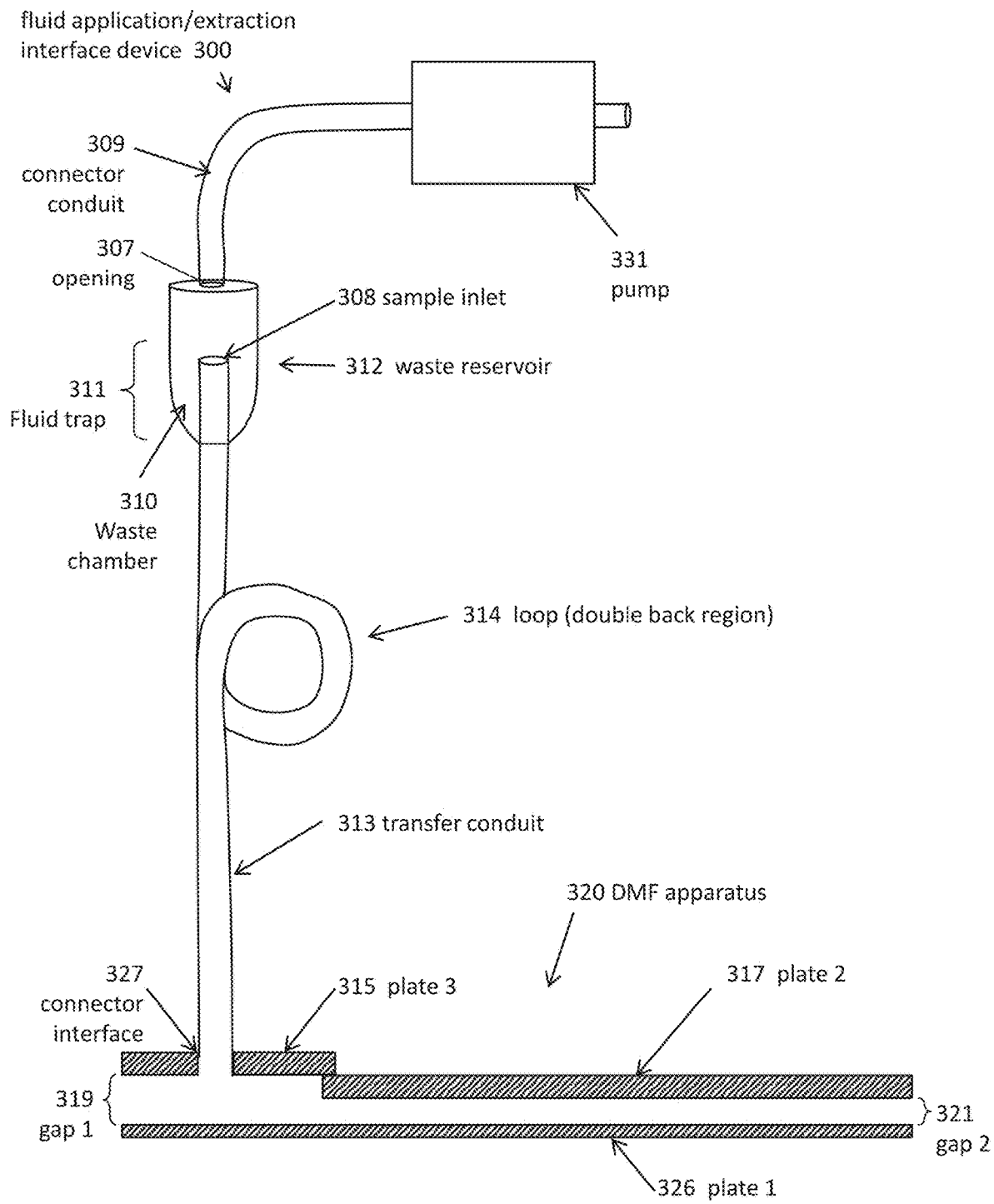
FIG. 3 shows a fluid application and extraction device with a transfer conduit that doubles back on itself interfacing with a digital microfluidic device apparatus.

Described herein is a sample handling system useful for handling and manipulating small to intermediate (or even large) volumes of fluid samples, such as a clinical, laboratory, biological or chemical sample. The system may be especially useful for handling dilute samples in a liquid media for which a relatively large volume of sample is desired (e.g., to obtain sufficient material for readily performing an analysis). The system may be useful for extracting and purifying an analyte from a clinical, laboratory, environmental, or other sample. The system may be useful for manipulating a sample that requires multiple handling steps, such as multiple wash or incubation steps. Manipulating may include, for example, adding a wash buffer, removing a used buffer away from a sample, adding magnetic particles, etc.

In one aspect, a sample handling system includes a fluid application and extraction interface device for a digital microfluidics (DMF) apparatus, the device comprising: a waste reservoir comprising a fluid trap, wherein the fluid trap comprises a sample inlet extending above a waste chamber when the device is held upright; an opening through the waste reservoir above the sample inlet when the device is held upright; and a transfer conduit extending through the waste reservoir, wherein the sample inlet opens into the transfer conduit at a proximal end of the sample inlet so that fluid may pass from the transfer conduit into the waste reservoir and be trapped within the waste chamber; wherein the transfer conduit is configured to couple to the DMF apparatus at a distal end of the transfer conduit. Some fluid application and extraction interface devices include a connector conduit coupled to the opening. In some fluid application and extraction interface devices, the transfer conduit doubles back on itself two or more times between the waste reservoir and the distal end of the transfer conduit.

The system generally includes 3 modules: an extraction module, which enables macroscale extraction of analyte from clinical samples; a purification module (DMF apparatus), which enables purification and concentration of analyte; and a module interface, which mediates interaction between the modules. FIGS. 1A-1C show different modules of a sample handling system as described herein. FIG. 1A shows a side view of extraction module 2. FIG. 1B shows a perspective view of a purification module (a digital microfluidic device) having an array of electrodes. FIG. 1C shows a view of an extraction module interfacing with a purification module (a digital microfluidic device) through a module interface. FIG. 1A and FIG. 1C show extraction module 311 with waste chamber 310, and transfer conduit 313 (also called sample prep tubing). FIG. 1C also shows connector conduit 309. Extraction module 311 includes waste reservoir 312 which houses waste chamber 310. Waste reservoir 312 may be a container or tube or tube-like structure such as with a top wall, one or more side wall (s) and a bottom wall and an open space (chamber) inside. In some cases, waste reservoir 312 may not have a top wall and/or a bottom wall and the top and/or bottom of waste reservoir 312 may be open. Generally, in these cases, the open space may be filled with a conduit that takes up essentially the entire area of the top (e.g., connector conduit 309) or bottom (e.g., transfer conduit 311) of waste reservoir 312. In some examples, extraction module 311 or a waste reservoir may be a centrifuge tube or microcentrifuge tube (e.g., 0.5 ml; 1.5 ml, 5 ml etc.) or another tube with conical side walls and with or without bottom or top walls. A waste reservoir or a tube in a waste reservoir may have a volume of 0.1 ml or greater than 0.1 ml, 0.2 ml or greater than 0.2 ml, 0.3 ml or greater than 0.3 ml, 0.4 ml or greater than 0.4 ml, 0.5 ml or greater than 0.5 ml, 1 ml or greater than 1 ml, 2 ml or greater than 2 ml, 3 ml or greater than 3 ml, 4 ml or greater than 4 ml, 5 ml or greater than 5 ml, 10 ml or greater than 10 ml, 25 or greater than 25 ml, 50 ml or greater than 50 ml, less than 50 ml, less than 25 ml, less than 10 ml, less than 5 ml, less than 4 ml, less than 3 ml, less than 2 ml, less than 1 ml, less than 0.5 ml, less than 0.4 ml, less than 0.3 ml, less than 0.2 ml, less than 0.1 ml or anything in between such as between 0.1 ml and 1.0 ml, between 0.4 ml and 2 ml, between 0.4 ml and 50 ml, between 0.5 ml and 50 ml, between 0.1 ml and 30 ml, etc. Any shape container that houses a waste reservoir, has space for a connector conduit, space for transfer conduit, etc. may be used. Waste reservoir 312 may be made of any material such as a polypropylene, another polymer, etc. as long as it can hold a fluid, withstand pressure from the pump if used and so on. FIG. 1C shows connector conduit 309 with a proximal (first) end connected to pump 331 and a distal (second) end that extends into waste reservoir 312. Connector conduit 309 may be open at its proximal end, but will generally be connected to a controllable pressure source (e.g., a pump) to selectively apply positive or negative pressure in the transfer conduit. (Proximal as used here is the end closest to the controllable pressure source or furthest from a DMF device). In some examples, a fluid application and extraction interface device includes a connector conduit coupled to the opening through the waste reservoir above the sample inlet. Fluids are delivered through pressure-driven flow generated by the pump. Pump 331 may act on the sample handling system to draw fluid from a purification module (DMF device) into an extraction module or to expel fluid from the extraction module onto the surface of a purification module (DMF device). Connector conduit 309 may open distally into waste reservoir 312 and/or into waste chamber 310. Connector conduit 309 may have a tight seal with waste reservoir 312, such that pump 331 is able to pull a vacuum or generate pressure within waste reservoir 312. Connector conduit 309 may couple waste reservoir 312 or waste chamber 310 with pump 331. Connector conduit 309 may be open proximally and may be used to place a fluid from a distal location into waste reservoir 312 or into transfer conduit 313. Some fluid application and extraction interface devices include a peristaltic pump coupled to either the connector conduit or the transfer conduit to selectively apply positive or negative pressure in the transfer conduit. Pump 331 may be a positive displacement pump such as a peristaltic pump configured to move a fluid though a system. Pump 331 may act to generate a pressure-driven flow to cause fluids to move in the sample handling system, and to deliver fluids under pressure such as through waste reservoir 312, transfer conduit 313 (including through double back region 314), through module interface 327, and onto digital microfluidic apparatus 320 (purification module). In some examples, a fluid application and extraction interface device includes a transfer conduit coupled to the opening through the waste reservoir above the sample inlet. Some fluid application and extraction interface devices include a controllable pressure source to selectively apply positive or negative pressure in the transfer conduit, wherein the controllable pressure source is coupled to either: a connector conduit connected to the opening through the waste reservoir above the sample inlet; or the transfer conduit. Pump 331 may act under negative pressure (e.g., a vacuum) to draw fluids into transfer conduit 313 or another part of the system, such as to draw a fluid from digital microfluidic apparatus 320 (purification module) and into transfer conduit 313, and even into or through double back region 314, sample inlet 308 of transfer conduit 313, and into waste chamber 310. In some examples, pump 331 may alternate between positive and negative pressure (e.g., pushing and pulling) and may rapidly shuttle a solution between different areas of a sample handling system. In a particular example, a pump may rapidly shuttle a fluid between a surface (top plate) of a purification module and transfer conduit 313. Such a shuttled fluid may move partway through transfer conduit 313 or may move most or all of the way through transfer conduit 313. In some examples, a fluid may stay or rest in double back region 314 before being removed to the digital microfluidic apparatus 320 (purification module).

FIG. 1A also shows transfer conduit 313 extending proximally (e.g., from below waste reservoir 312) through a base of waste reservoir 312 and into waste chamber 310, ending at sample inlet 308. Transfer conduit 313, with one end inserted into waste reservoir 312 and waste chamber 310 serves proximally as Sample Inlet and the other end (distal end) is useful for conducting a fluid from waste reservoir 312 to module interface 327 and vice versa. In some examples, a sample containing an analyte to be analyzed may be loaded through sample inlet 308 and into transfer conduit 313. FIG. 1A also shows transfer conduit 313 with double back region 314, and module interface 327. Transfer conduit 313 may be rigid or flexible but in general will be flexible and chemically inert. In some examples transfer conduit 313 comprises tubing. In some examples, transfer conduit 313 may be a flexible polymer tubing such as Tygon® tubing. It is noted that the composition of Tygon® tubing is kept as a trade secret and the current disclosure includes existing tubing as well as any tubing developed in the future so long as it can withstand the necessary pressure and function to transport fluids as needed. Transfer conduit 313 can be any length or any size (diameter) as long as it can withstand the necessary pressure and function to transport fluids as needed. Transfer conduit 313 may have an inner diameter (D) of about 0.1 mm or greater than 0.1 mm, 0.2 mm or greater than 0.2 mm, 0.3 mm or greater than 0.3 mm, 0.4 mm or greater than 0.4 mm, 0.5 mm or greater than 0.5 mm, 1 mm or greater than 1 mm, 1.5 mm or greater than 1.5 mm, 2 mm or greater than 2 mm, 2.5 mm or greater than 2.5 mm, 3 mm or greater than 3 mm, 5 mm or greater than 5 mm, 10 mm or greater than 10 mm, 20 mm or greater than 20 mm, or less than 20 mm, less than 15 mm, less than 10 mm, less than 5 mm, less than 4 mm, less than 3 mm, less than 2 mm, less than 1 mm or any size in between, such as between such between about 0.5 mm ID and 5 mm ID, 0.1 mm ID and 5 mm, 1 mm and 5 mm, etc.

Waste chamber 310 includes a chamber or space configured to hold fluid and may be sized to hold one or more than one waste samples. In general a waste sample will be transported from outside the extraction module to the waste chamber via transfer conduit 313. In one example, a waste sample is transported from the surface of the purification module through transfer conduit 313 to waste chamber 310. Some embodiments may include the step of removing a waste sample from a purification module (DMF device), moving the waste sample though transfer conduit 313, moving the waste sample through sample inlet 308, and depositing the waste sample in the waste chamber. The sample may be pushed or pulled (aspirated) from the purification module into waste chamber 310 but in general will be pulled via reduced pressure generated by pump 331. The fluid waste sample may travel through/over sample inlet 308 and drop into waste chamber 310 for storage. This step may be repeated (2 times, 3 times, etc.) with the same type or with a different type of waste fluid.

Transfer conduit 313 may also include double back region 314 (a holding section) configured for holding a fluid (e.g., for holding a sample to be analyzed or a lysis buffer or wash buffer). In some examples, double back region 314 may be shaped (e.g., be non-linear) such that it holds a fluid against the effect of gravity (e.g., in the absence of an applied vacuum or applied pressure). For example, double back region 314 may be curved so that by virtue of its curved shape it cradles or holds a fluid sample and prevents it from draining out of double back region and therefore from draining out of transfer conduit 313 onto the purification module. As used herein, doubling back may refer to forming a loop or S shape (e.g., turning away from a first direction towards a second direction, then back towards the first direction), or more or more loops or any number of turns. In some examples the double back (doubled back or doubling back) region of the transfer conduit is a loop or S-shaped region that is arranged so that the transfer conduit loops one or twice (or more) and then faces downward to connect to top plate of the DMF apparatus.

FIG. 1A shows double back region 314 in the form of a loop. The transfer conduit may double back on itself between the waste reservoir and the distal end of the transfer conduit two or more than two times, three or more than three times, four or more than four times, five or more than five times, more than 10 times, more than 20 times and/or fewer than 2 times, fewer than 3 times, fewer than 4 times, fewer than 5 times, fewer than 10 times, fewer than 20 times, fewer than 30 times, or fewer than 40 times or anything in between these numbers (more than 2 but fewer than 5 times, more than 5 but fewer than 7 times, etc.). Double back region 314 may be bent or curved in one or more than one places, may be U-shaped, S-shaped, swirled, looped, coiled. A holding section or double back region may have one or more than one loops or coils, two or more than two loops or coils, three or more than three loops or coils, four or more than four loops or coils, five or more than five loops or coils, ten or more than ten loops or coils, twenty or more than twenty loops or coils, or fewer than five loops or coils, fewer than ten loops or coils, or fewer than twenty loops or coils or any number in between these such as from five to ten loops or coils or from one to four loops or coils, from two to seven loops or coils etc.). The number of double back regions (or loops, or coils, or other holding feature) may be chosen for any reason. For example, the number of double back regions may be chosen such that it is able to hold a sufficient volume of fluid for a particular application (e.g., extraction from a plasma sample) but that the conduit does not collapse under application of a reduced pressure (e.g., so that a tube does not collapse under an applied vacuum). In some examples, double back region 314 may include 2 or more holding sections configured to hold a fluid separated from each other by an "in between" section, such as two, three, or more separate sections of coils, swirls, etc. Such in between sections may be filled with gas, oil, gel, or another media. Such sections may serve to separate different fluids (e.g., they may separate a first buffer from a second buffer, etc.). Double back region 314 may be configured with a different material (such as a charged material that "holds" a fluid by electrostatic or other forces) than the rest of the transfer conduit. Although double back region 314 may hold any type of material, it may be especially useful for holding or sustaining low surface tension fluids, thereby preventing them from draining out of transfer conduit 313 and onto digital microfluidic apparatus 320 (purification module). Double back region 314 (and the rest of the tubing) may have constant diameter throughout or may have an area that has a larger diameter than another area. For example, double back region 314 may have a single coil that has a diameter that is larger than a diameter along a section of transfer conduit 313 that does not hold fluid. Double back region 314 or holding region may hold or be configured hold any type of fluid, such as a liquid, a gel, a mixture, a suspension, a buffer, a wash buffer, a sample of interest, a sample to be lysed, a sample to be hybridized, etc. (e.g., against gravity). Some embodiments include a pre-loaded fluid, such as liquid, a gel, a mixture, a buffer, a wash buffer, a sample of interest, a sample to be lysed, a sample to be hybridized, held by the holding section. In some examples, a holding section may hold two or more different fluids, separated by a gap such as an air gap, an oil gap or another type of gap. Double back region 314 may be configured to hold any amount of fluid, such as to hold from 10 ul to 10 ml of fluid or anything in between such as up to 10 ml, up to 5 ml, up to 1 ml, up to 900 ul, up to 800 ul, up to 500 ul, up to 100 ul, etc.

FIG. 1B (and see also FIG. 1C) shows a perspective view of a purification module (digital microfluidic (DMF) device) having an array of electrodes 341. In general, (and as explained in more detail below) fluid droplets are sandwiched in the purification module between a bottom plate and one or more top plates that serves to hold the fluid droplets. Actuation electrodes on or adjacent to the bottom plate and counter electrodes on or adjacent to top plates work together to move fluid drops/droplets between the plates and/or along the top plate by applying voltage to adjacent positions to generate electrowetting forces. For more detail about the working of DMF devices, see, for example WO 2016/06184 which is incorporated herein by reference in its entirety. In some embodiments, a purification module has large gaps (such as generated by spacers >1 mm) between the bottom and top plates to accommodate real-world volumes (hundreds of microliters to milliliters) to allow for droplet creation and cutting.

FIG. 2 shows a close up view of module interface 327 connected to transfer conduit 313. Module interface 327 interfaces with a top plate of digital microfluidic apparatus 320 (DMF apparatus or purification module). Module interface 327 may include a coupling configured to couple the module interface with the DMF apparatus. DMF apparatus 320 may include a coupling on the DMF apparatus configured to couple the DMF apparatus with the transfer conduit. A coupling generally has an opening and may have a special feature to aid in coupling a module interface to a DMF device (or coupling a DMF device to a module interface), such as a lip, flange, raised portion etc. Module interface 327 includes an opening for transferring fluids into or out of transfer conduit 313. DMF apparatus 320 also includes a hole for transferring fluids.

FIG. 3 shows an embodiment of fluid application/extraction interface device 300 coupled to DMF apparatus 320 though transfer conduit 313 at connector interface 327. Waste reservoir 312 has fluid trap 311 for trapping fluid in waste chamber 310 brought to waste reservoir 312 though transfer conduit 313. Waste reservoir 312 is also coupled to pump 331 through connector conduit 309.

A DMF apparatus manipulates liquid droplets using a plurality of electrodes. Some DMF apparatuses useful with the disclosure herein have a "two-plate" format in which droplets are sandwiched between a top plate and a bottom plate. The bottom plate has a plurality of electrodes adjacent to a first hydrophobic layer or electrically insulating layer. The top plate has a counter-electrode adjacent a second hydrophobic layer or electrically insulating layer and there is a gap between the top and bottom layers. In some examples a gap between the top layer and bottom layer is at least 1 mm, at least 1.1 mm, at least 1.2, mm, at least 1.3 mm, at least 1.4 mm, at least 1.5 mm at least 2 mm, at least 3 mm, less than 5 mm, less than 4 mm, less than 3 mm, less than 2 mm, less than 1.5 mm, less than 1.4 mm, less than 1.3 mm, less than 1.2 mm, less than 1.1 mm or anything in between (e.g., at least 1 mm and less than 2 mm; at least 1.2 mm and less than 1.8 mm, etc.). A particular size gap may be chosen for any reason, such as to optimize for a particular type of sample or a particular sample handling procedure (e.g., sample extraction from blood; sample extraction from cell culture; a clinical sample; sample hybridization, etc.). Some aspects of the disclosure include an air-matrix digital microfluidic (DMF) apparatus including: a first plate having a first hydrophobic layer; a second plate having a second hydrophobic layer; a third plate having a third hydrophobic layer; a first air gap formed between the first and second hydrophobic layers, wherein the first gap is 1 mm or less; a second air gap formed between the first and second hydrophobic layers, wherein the second air is greater than 1 mm and wherein the first and second air gaps are continuous and the second and third plates overlap with each other; a plurality of actuation electrodes adjacent to the first hydrophobic layer extending from the first air gap to the second air gap; and a fluid extraction region in the first second air gap.

Figure 5A:
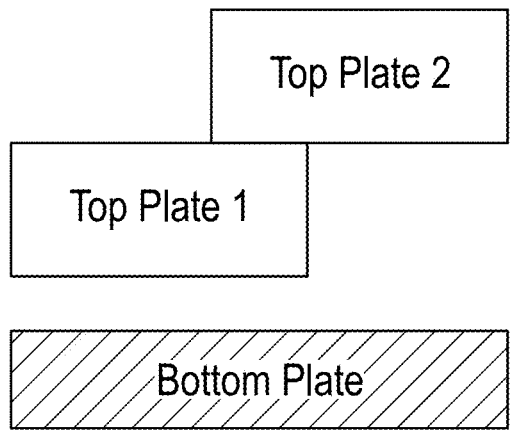
FIG. 5A shows a schematic side view of a portion of a digital microfluidic device for diluting a sample.
Figure 5B:
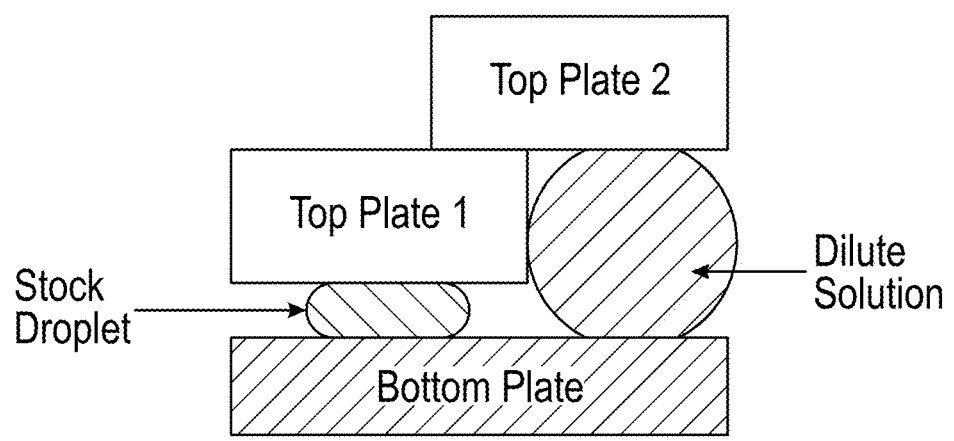
FIG. 5B shows a side view the DMF apparatus of FIG. 5A, including a large pool (droplet) of dilute solution and a smaller droplet.
Figure 6A:
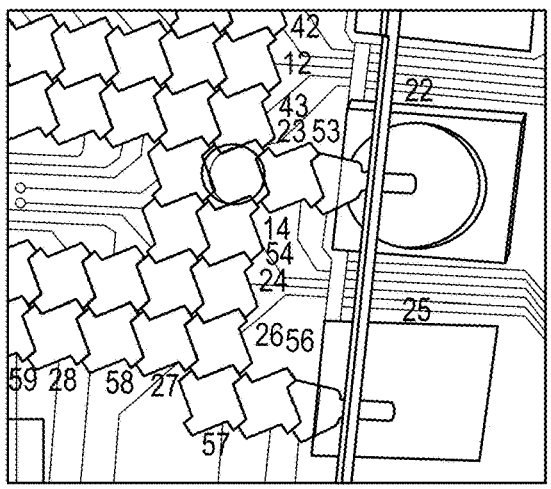
FIGS. 6A-6E illustrate the movement of a droplet from a loading region of a DMF apparatus having a first plate separation (e.g., >1 mm) to a second, lower volume portion or region of a DMF apparatus, having a plate separation of <1 mm.
Figure 6B:
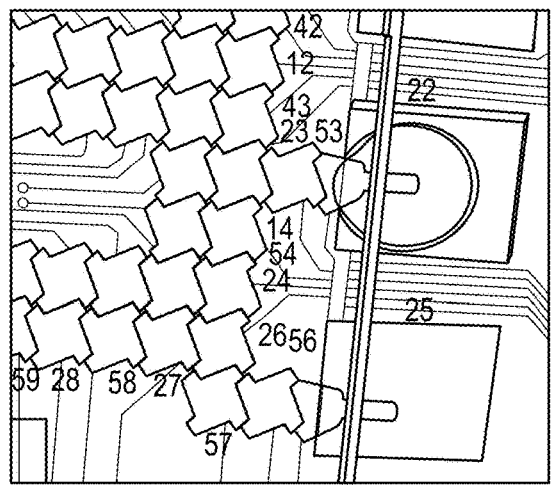
Figure 6C:
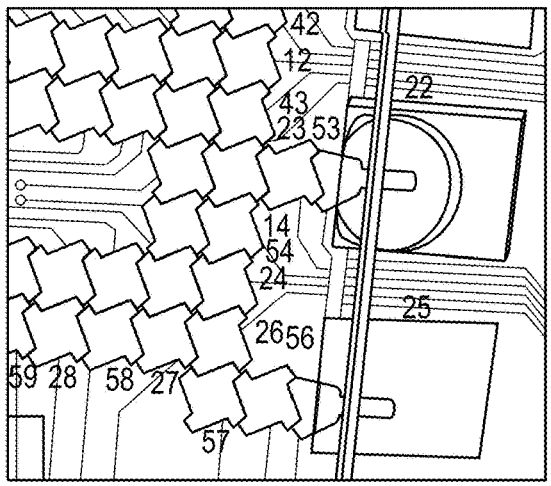
Figure 6D:
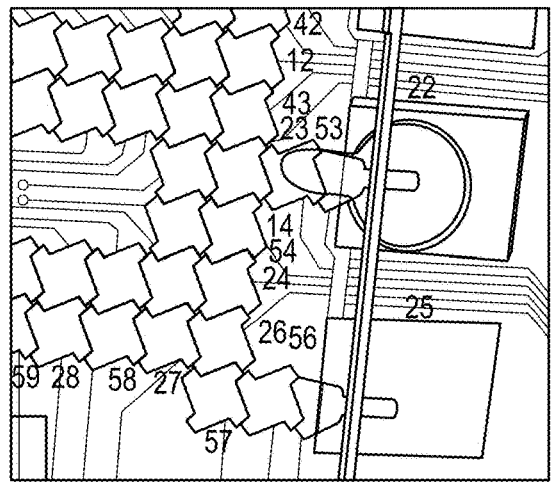
Figure 6E:
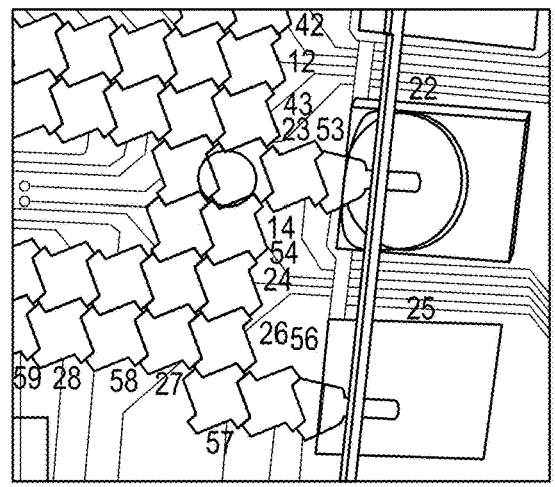

Described herein is a DMF apparatus with a three-plate or multi-plate format useful with a fluid application/extraction interface device 300 as described herein or for another such application, such as a different fluid application or extraction system. In addition to a top plate and bottom plate, the three-plate format includes a third plate. FIG. 3 (and see also FIG. 5A and FIG. 5B) shows an air-matrix digital microfluidic (DMF) apparatus 320 with plate 1 326 (also called bottom plate) having a first hydrophobic layer, plate 2 317 having a second hydrophobic layer, and plate 3 315 (also called top plate 2) having a third hydrophobic layer. FIG. 3 also shows the second and third plates overlap with each other. FIG. 3 also shows first air gap 1 319 between the hydrophobic layer on plate 1 326 (the first hydrophobic layer) and the hydrophobic layer on plate 3 315 (third hydrophobic layer). FIG. 3 also shows plate 2 317 (also called top plate 1) and plate 1 326 (bottom plate) with second air gap 2 321 between the hydrophobic layer on plate 1 326 (first hydrophobic layer) and the hydrophobic layer on plate 3 315 (third hydrophobic layer). FIG. 3 also shows first air gap 1 and second air gap 2 are continuous. First air gap 1 may be greater than 0.1 mm or greater than 0.1 mm, 0.5 mm or greater than 0.5 mm, 1 mm or greater than 1 mm, 1.5 mm or greater than 1.5 mm, 2 mm or greater than 2 mm, 2.5 mm or greater than 2.5 mm or less than 0.5 mm, less than 1 mm, less than 1.5 mm, less than 2 mm, less than 2.5 mm, less than 5 mm, less than 10 mm, or anything in between, such as greater than 1 mm and less than 5 mm, greater than 1.5 mm and less than 2.5 mm, etc.). Second air gap 2 may be greater than 0.1 mm or greater than 0.1 mm, 0.5 mm or greater than 0.5 mm, 1 mm or greater than 1 mm, 1.5 mm or greater than 1.5 mm, 2 mm or greater than 2 mm, 2.5 mm or greater than 2.5 mm or less than 0.5 mm, less than 1 mm, less than 1.5 mm, less than 2 mm, less than 2.5 mm, less than 5 mm, less than 10 mm, or anything in between, such as greater than 1 mm and less than 5 mm, greater than 1.5 mm and less than 2.5 mm, etc.). In some examples, the first air gap is greater than 1 mm and the second air gap is 1 mm or less. In some examples, the first air gap is greater than 1 mm and less than 1.2 mm and the second air gap is 1.2 mm or greater.

The bottom plate has a plurality of actuation electrodes adjacent to an insulator or first hydrophobic layer. In some examples, the plurality of actuation electrodes extend from the first air gap to the second air gap. The top plate also has a hydrophobic layer (second hydrophobic layer) and a counter-electrode adjacent the second hydrophobic layer. The multi-layer format may be especially useful for handling larger or more dilute samples.

One aspect of the disclosure includes a digital microfluidics (DMF) apparatus configured to handle large sample volumes, the device including a first plate having a first hydrophobic layer; a second plate having a second hydrophobic layer; a gap formed between the first and second hydrophobic layers, wherein the distance between the first plate and the second plate is 1 mm or greater; a plurality of actuation electrodes arranged in a first plane adjacent to the first hydrophobic layer; a fluid application and extraction interface device configured to apply or remove fluid into the gap, the fluid application and extraction interface device comprising: a waste reservoir comprising a fluid trap, wherein the fluid trap comprises a sample inlet extending above a waste chamber; an opening through the waste reservoir above the sample inlet; and a transfer conduit extending through the waste reservoir, wherein the sample inlet opens into the transfer conduit at a proximal end of the sample inlet so that fluid may pass from the transfer conduit into the waste reservoir and be trapped within the waste chamber; wherein a distal end of the transfer conduit is coupled to an opening on one of: the first plate, the second plate or between the first and second plates.

A fluid, such as a wash fluid, is contained between a top plate and a lower/bottom plate and may be moved from a location between the plates to the top of the device (e.g., to on top of the top plate) through a hole in the top plate. A fluid may be moved by any means, such as by an electrical field using the array of electrodes, by pull from a negative pressure applied through module interface 327, etc. In this way, extraction module 311 is directly interfaced to digital microfluidic apparatus 320 (purification module) through a hole in the top plate of the DMF apparatus. Some examples include depositing (a droplet) of fluid onto the surface of digital microfluidic apparatus 320 module interface 327 deposits a droplet of a fluid from transfer conduit 313 Some examples include withdrawing (a droplet) of a fluid from a DMF apparatus; and drawing a (droplet of) fluid from a surface of digital microfluidic apparatus 320 through module interface 327 and into transfer conduit 313. Some examples further include drawing the fluid through transfer conduit 313, through sample inlet 308 and into fluid trap 311 and depositing the fluid into waste reservoir 312. Such a fluid will generally be an unwanted waste fluid. Some examples include drawing a first (droplet of) fluid through module interface 327 and into transfer conduit 313 and then drawing (a second droplet of) fluid (which can be the same, but will generally have a different composition from the first fluid) through transfer conduit 313. Some examples include depositing some or all of the droplets onto the surface of digital microfluidic apparatus 320 and may include drawing some or all of the fluid back into transfer conduit 313. The drawing and depositing steps can be repeated with rapid cycling between the two. This may be useful, for example to mix two or more solutions together. The drawing and depositing of a droplet onto and from the surface of the DMF apparatus can be controlled by positive and negative pressure, respectively, from pump 331.

One aspect of the disclosure includes a method of selectively removing large volumes of fluid from a digital microfluidic (DMF) apparatus, the method including moving a fluid between a first plate and a second plate of the DMF apparatus to a fluid extraction region, wherein the first plate and the second plate are separated by a first gap of 1 mm or more, and wherein the first plate comprises a plurality of actuation electrodes; applying negative pressure to a transfer conduit coupled to the fluid extraction region either between the first plate and the second plate of the DMF apparatus or to an opening through the first plate or the second plate of the DMF apparatus; drawing all or a portion of the fluid into the transfer conduit, through the transfer conduit along an inverting path that doubles back on itself two or more times, out of a sample inlet of a fluid trap, and into a waste chamber below the sample inlet; and applying energy to a subset of the plurality of actuation electrodes to move a droplet from between the first gap to a second gap between the first plate and a second plate that are separated by a distance that is less than 1 mm.

Example 1 Application: miRNA Extraction and Purification

To evaluate a utility of the system described herein in processing of real-world samples, we tasked it with extraction and purification of miRNA from human plasma, through implementation of TaqMan® miRNA ABC Purification Kit (Thermo Fisher Scientific). As illustrated in FIGS. 4A-4F, a plasma sample (50 µL) was introduced into the system's Purification Module (i.e. DMF platform) from the first tubing (e.g., from sample prep tubing), then sequentially mixed with Lysis Buffer (100 µL) and miRNA Binding Beads (80 µL), in each case aspirating the reagent mixture from the Purification Module into Transfer conduit and then rapidly shuttling the bolus between the two locations to mix thoroughly (frames 1-3). After allowing the beads to bind miRNA in the Lysate (40 min incubation at 35° C.), the reaction mixture (total volume: 150 µL) was exchanged between the Purification Module and Transfer conduit three times while engaging an external magnet beneath the interface area, such that the beads were recovered from the reaction mixture by immobilizing them on the surface of the DMF device. The reaction mixture fluid was aspirated into the Waste Chamber, and the beads reconstituted using 100 µL of Wash 1 Buffer delivered to the interface by the Purification Module via electrowetting (frame 4). The beads were released into Wash 1 Buffer (by disengaging the magnet), and the fluid shuttled between Purification Module and Transfer Tube in order to thoroughly wash the bead-bound miRNA. After recovering the beads onto the surface (by re-engaging the magnet) and sending the fluid to the Waste Chamber, the wash cycle was repeated 3× using 100 µL of Wash 2 Buffer (frame 5). Finally, the cycle was repeated using 100 µL of Elution Buffer (frame 6) (3 min incubation at 70° C.). We evaluated the performance of our DMF system by quantifying its processed products to those generated by benchtop extraction and purification of plasma miRNA using RT-qPCR analysis of the obtained samples. cDNA samples were diluted 1:20 prior to qPCR. Dilution post cDNA synthesis is important prior to qPCR for some samples. Described herein is an elegant, one-step dilution method on DMF.

Figure 7:
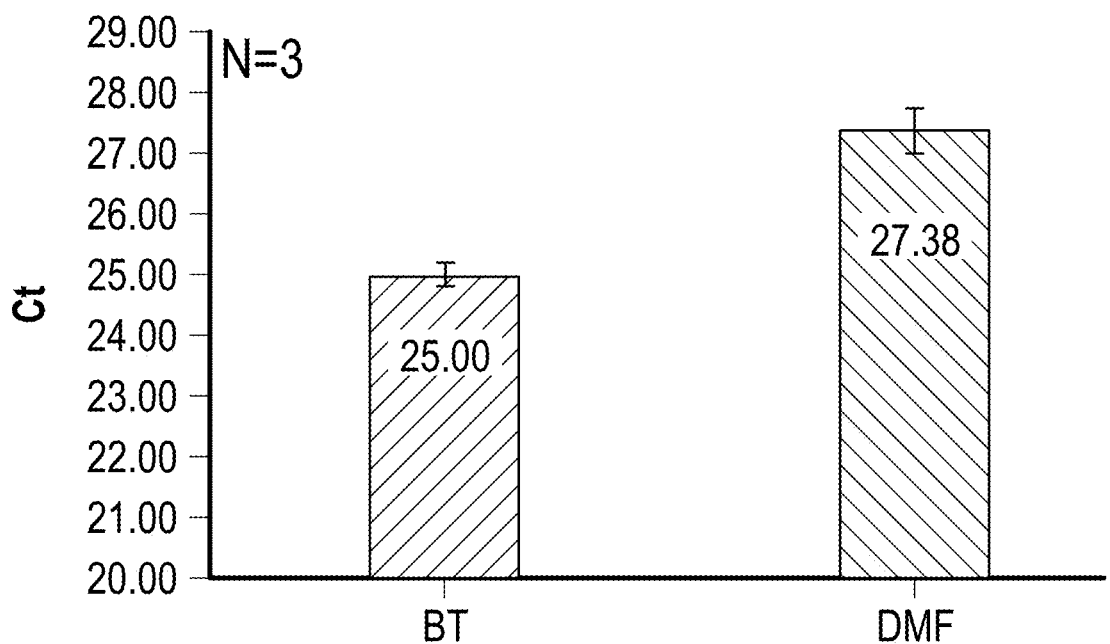
FIGS. 7 and 8 shows a comparison of RT-qPCR results from miRNA extracted and purified from plasma using a digital microfluidic system compared with a benchtop (BT) system.
Figure 8:
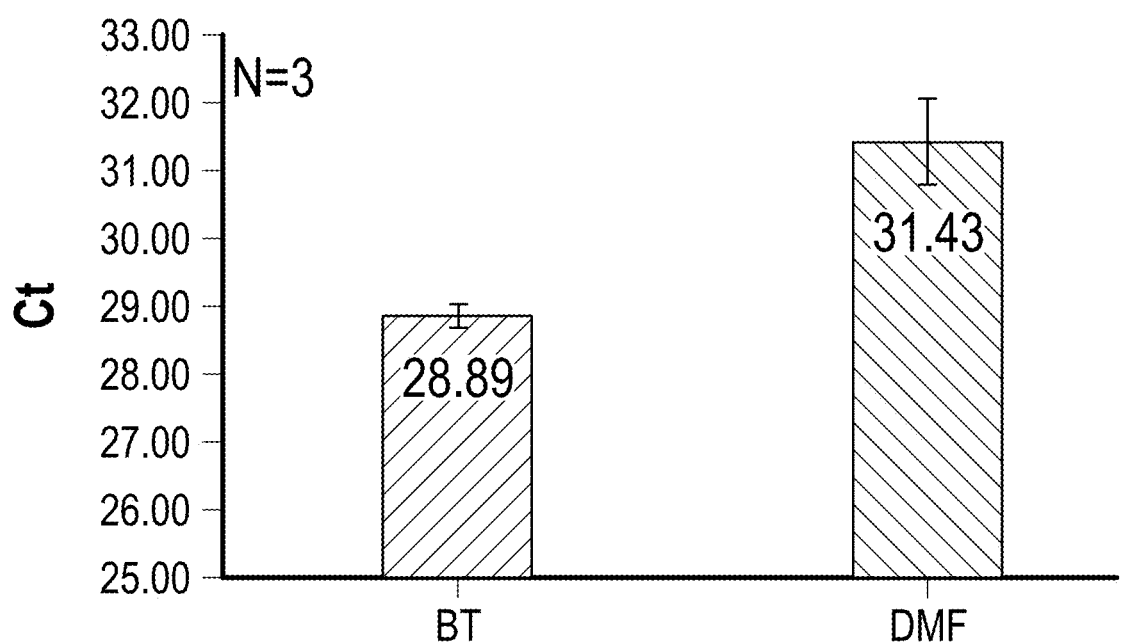

Results from three samples were averaged. FIG. 7 shows results for miRNA-39. Samples prepared using benchtop system gave an average Ct value of 25.00. Samples prepared using the DMF device gave an average Ct value of 27.38. FIG. 8 shows results for miRNA-54. Samples prepared using benchtop system gave an average Ct value of 28.89. Samples prepared using the DMF device gave an average Ct value of 31.43. Bars indicate the mean±standard deviation for the three miRNA samples. In both cases, RT-qPCR analysis of miRNA prepared by DMF system generated comparable Ct values to the benchtop (control) system.

Cartridges

Any of the apparatuses (e.g., system and methods) described herein may be used as part of a, or configured as, a cartridge for a DMF apparatus.

Figure 9:
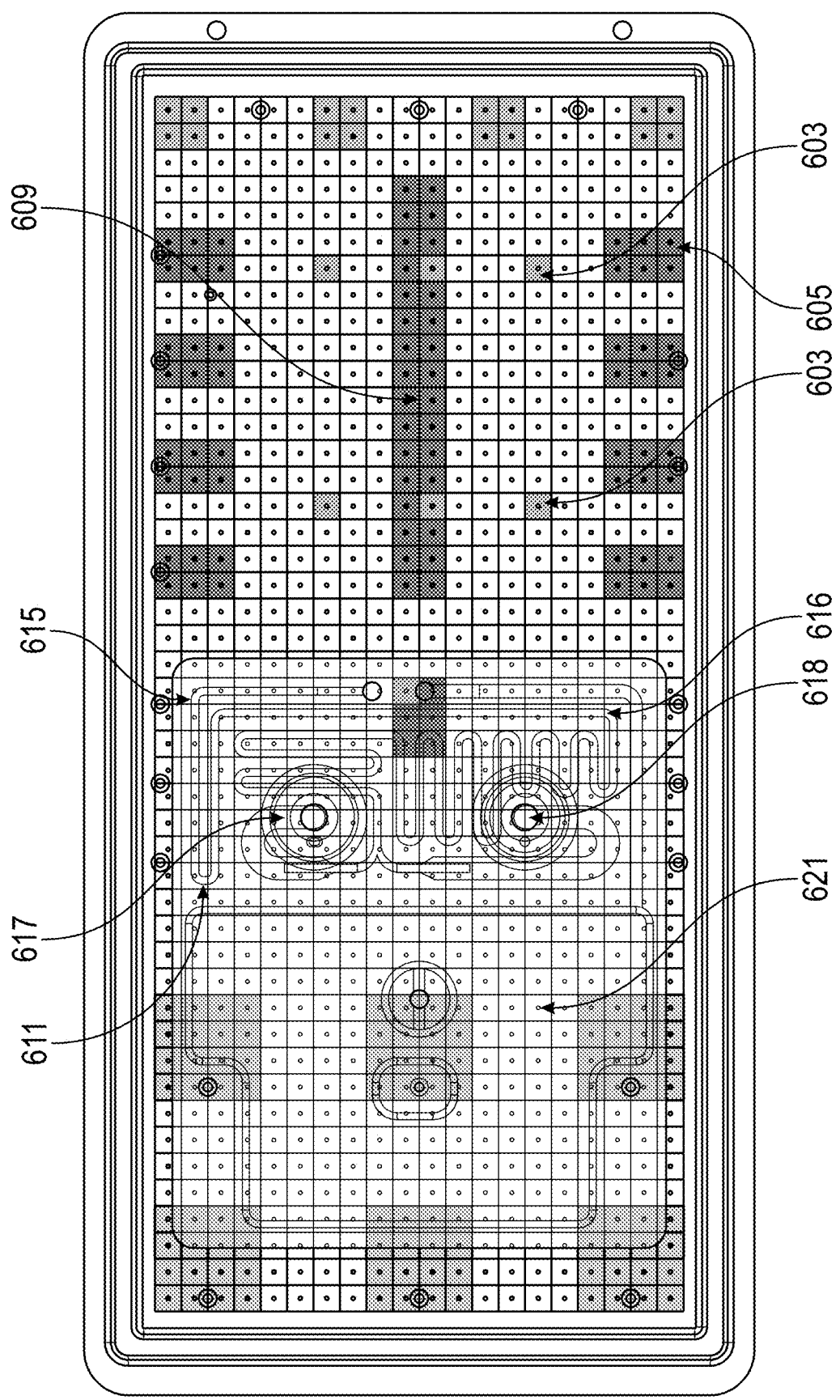
FIG. 9 illustrates an example of a cartridge for a DMF apparatus that includes different functional regions that maybe formed by an electrode array within the removable cartridge.
Figure 10:
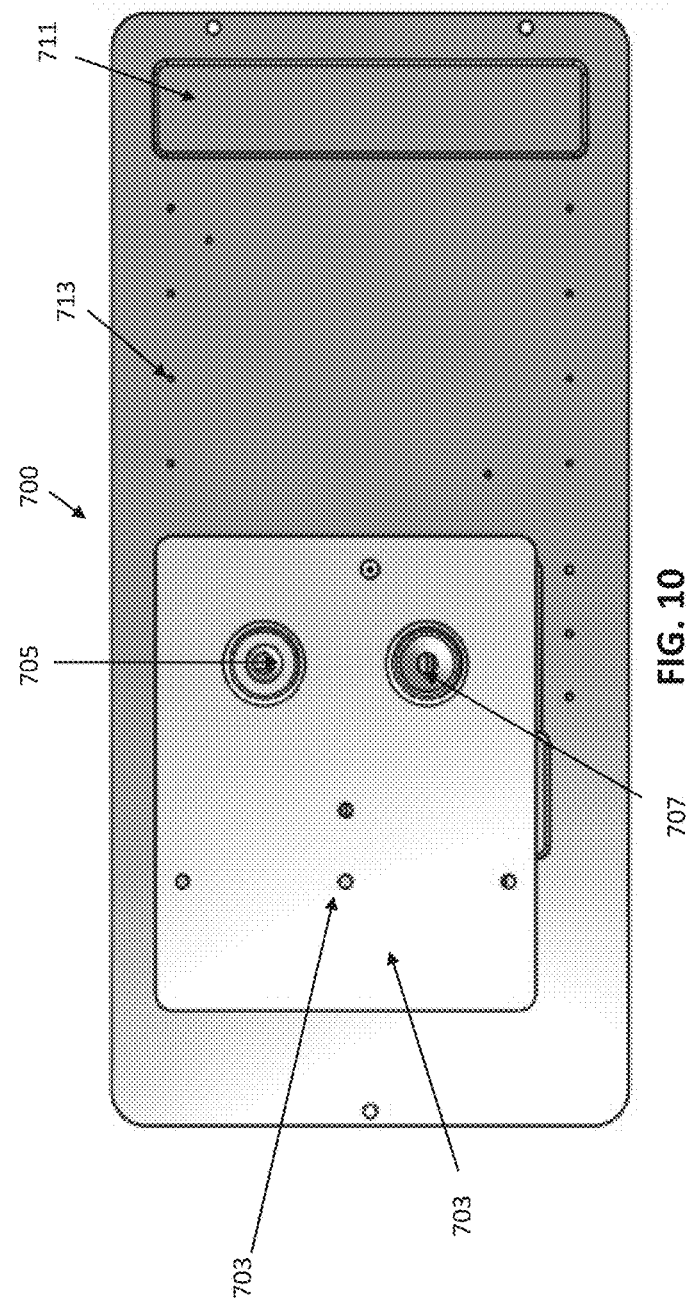
FIG. 10 is a top view of an exemplary cartridge as described herein. In this example the cartridge includes a DMF portion, including a top plate and dielectric, separated by an air gap, and a microfluidics portion (e.g., including a pair of sample compartments, one of which may be for waste, and/or microfluidic channels) that connects into the air gap, and may externally connect to a channel input and/or output, or a pump (e.g., vacuum pump). Fluid may be applied into the cartridge through one or more openings into the air gap (shown as small openings) and/or through the channel input/outputs. The right side of the cartridge includes a window region, allowing optical viewing through the cartridge.

For example, FIG. 9 illustrates a schematic of a cartridge for an air-gap DMF apparatus that includes a bottom that is a single dielectric material that is to be attached (e.g., by vacuum, adhesive, etc.) to a reusable surface that has a plurality of electrodes that may activate movement of droplets within the air gap. Different regions may be defined within the air gap based on the connections within and/or beneath (or in some variations, above) the seating surface. For example, in FIG. 9, solution may be dispensed through the top of the cartridge (e.g., the top plate), via one or more holes. The drive electrodes under the secured dielectric may therefore form a plurality of unit cells (one drive electrode per unit cell), and each cell or region of cells (multiple cells) may be controlled to perform a specified function. For example, in FIG. 9, the DMF apparatus includes an arrangement of zones or unit cells such as cooling zones (e.g., cooling via underlying Peltier zone) 605 that are arranged around the periphery of the cartridge. These regions may also be used to store solution, and may be held at between 3 degrees C. and 20 degrees C. (e.g., below 10 degrees C., between about 2 degrees C. and 25 degrees). The central heating zone(s) 609 may be used for heating a droplet. One or more magnetic zones 603 may be used for turning on/off magnetic fields that may be useful to immobilize a magnetic particle (e.g., for removing a material, etc.). Any of the zones may overlap. For example, at least one unit cell in the heating zone may also be a magnetic zone. Other functional zones include imaging/optical zones. In this case, the dual functions may be possible because the magnet may be positioned right under the heating zone when using resistive heating.

In addition to the zones formed by the configuration of the seating surface of the DMF apparatus, functional zones for providing an aliquot of solution, mixing a solution, and/or removing solutions may be formed into the cartridge, e.g., but cutting into the top plate to provide intimate access the air gap.

In any of the apparatuses, and particularly the cartridges, described herein, a microfluidic portion may be built into the cartridge. In particular, any of these apparatuses may include an extraction interface as described. This extraction interface may typically include a microfluidics chamber (e.g., compartment or compartments) that may optimally be connected to one or more microfluidics channels. For example, in FIG. 9, the upper (top plate) includes a microfluidics region that has been made transparent. In this example, the microfluidics region includes a microfluidics channel connected to a sample compartment. In general, a microfluidics channel (e.g., a micro channel) comprising a sample compartment may be used for mixing, dispensing and taking to waste on top plate from the air gap region. In addition, any of these cartridges may also include a reagent reservoir in the top plate. The microfluidics may be controlled by one or more valves (e.g., valve control) for dispensing and mixing and taking to waste. As used herein a microfluidics region may include a sample chamber and/or a microfluidics channel. The sample chamber may be configured to hold any fluid, including waste or sample fluid. Separate waste and sample chambers may be used.

In general a cartridge as described herein may include a dielectric, a first hydrophobic coating on the dielectric, a second hydrophobic coating on a ground electrode (and/or top pate) and the top plate onto which the ground electrode is coupled. The hydrophobic coating may be a Teflon coating, for example. The cartridge may also include one or more microfluidic channels, particularly those formed directly into the top plate with controlled access into the air gap.

For example, FIGS. 10-13 illustrate one example of a cartridge 700 including a microfluidics region 703 on the upper surface, covered by a cover 703 having one or more access ports 705, 707 for accessing the microfluidics portion of the device. The cover 703 may also include one or more valves and/or one or more openings 709 that may be used for delivering removing fluid and/or gas (e.g., air). The cartridge may also include openings through the top plate 713, including openings that connect the microfluidics channel to the air gap region within the channel.

Figure 11:
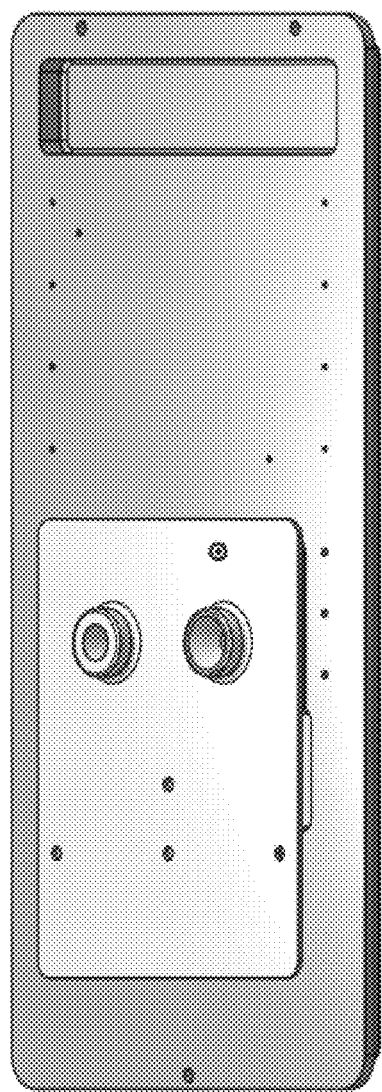
FIG. 11 shows a top perspective view of the cartridge of FIG. 10.
Figure 12:
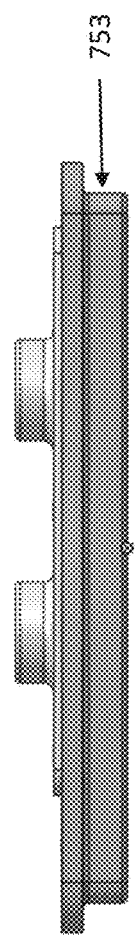
FIG. 12 is an end or side view from the left side of the cartridge of FIGS. 10 and 11, showing the upper microfluidics channels and the lower DMF portion (showing the spacing between the top, ground, plate and the dielectric, forming the air gap.
Figure 13:
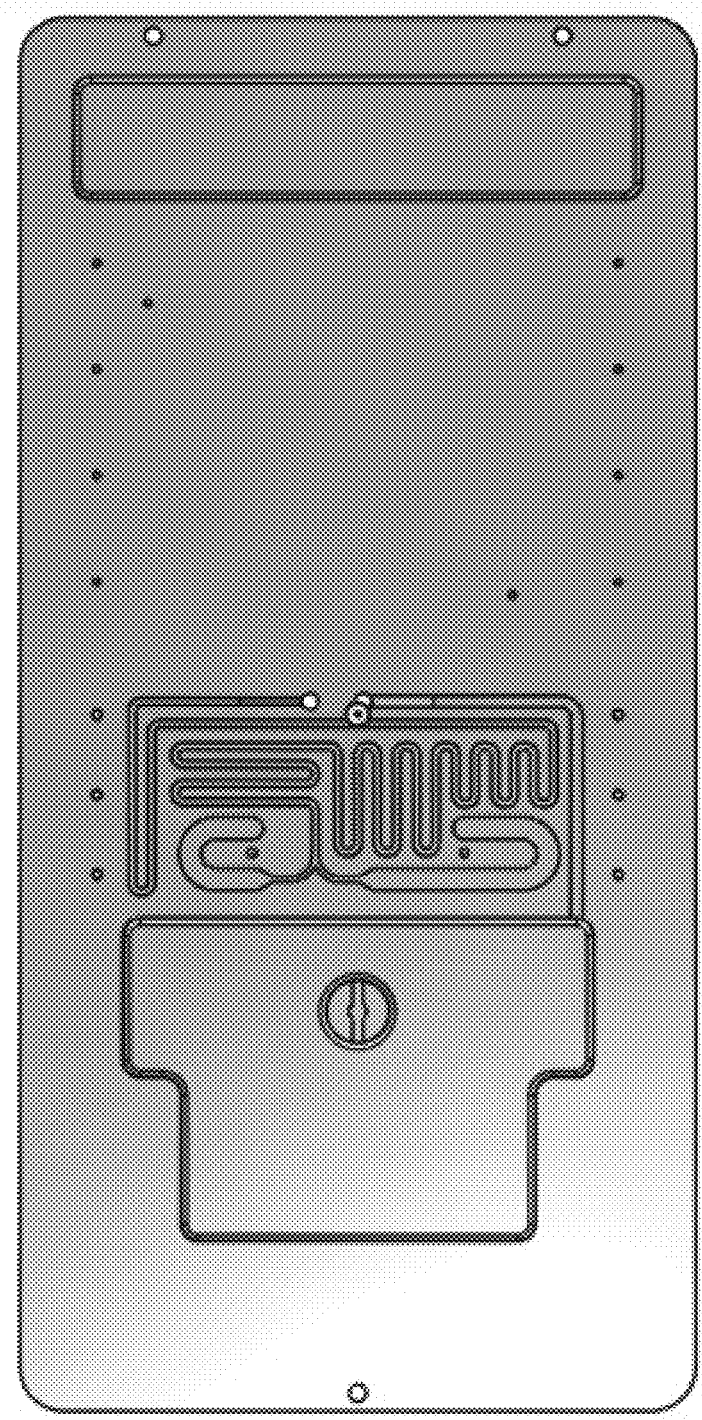
FIG. 13 is a top view of the cartridge of FIGS. 10-12, with the cover for the microfluidics channels removed, showing the channels.

Any of the cartridges described herein may also include one or more transparent window regions 711 for optically imaging one or more regions (readout regions) within the air gap. FIG. 11 is a top perspective view of the cartridge of FIG. 10. FIG. 11 shows a side view of the cartridge, showing the lowest bottom dielectric film 751 material. The air gap is not visible in FIG. 12, but may refer to the spacing 753 between the dielectric and the ground electrodes. FIG. 13 shows the top plate with the cover removed. Comparing FIG. 10 to FIG. 13, with the top removed, both the first and the second microfluidics channels are shown, each with an opening from the microfluidics channel into the air gap. In FIG. 13, the two channels may be simultaneously used by pushing/pulling fluid through one channel into the cell underlying them for rinsing, mixing, removing waste, etc. In FIGS. 10-13, there are via holes through the top plate in to air. Although the top plate may be thicker, in some variations it may be beneficial to include more reagents, including freeze-dried reagents that may be rehydrated.

Figure 14A:
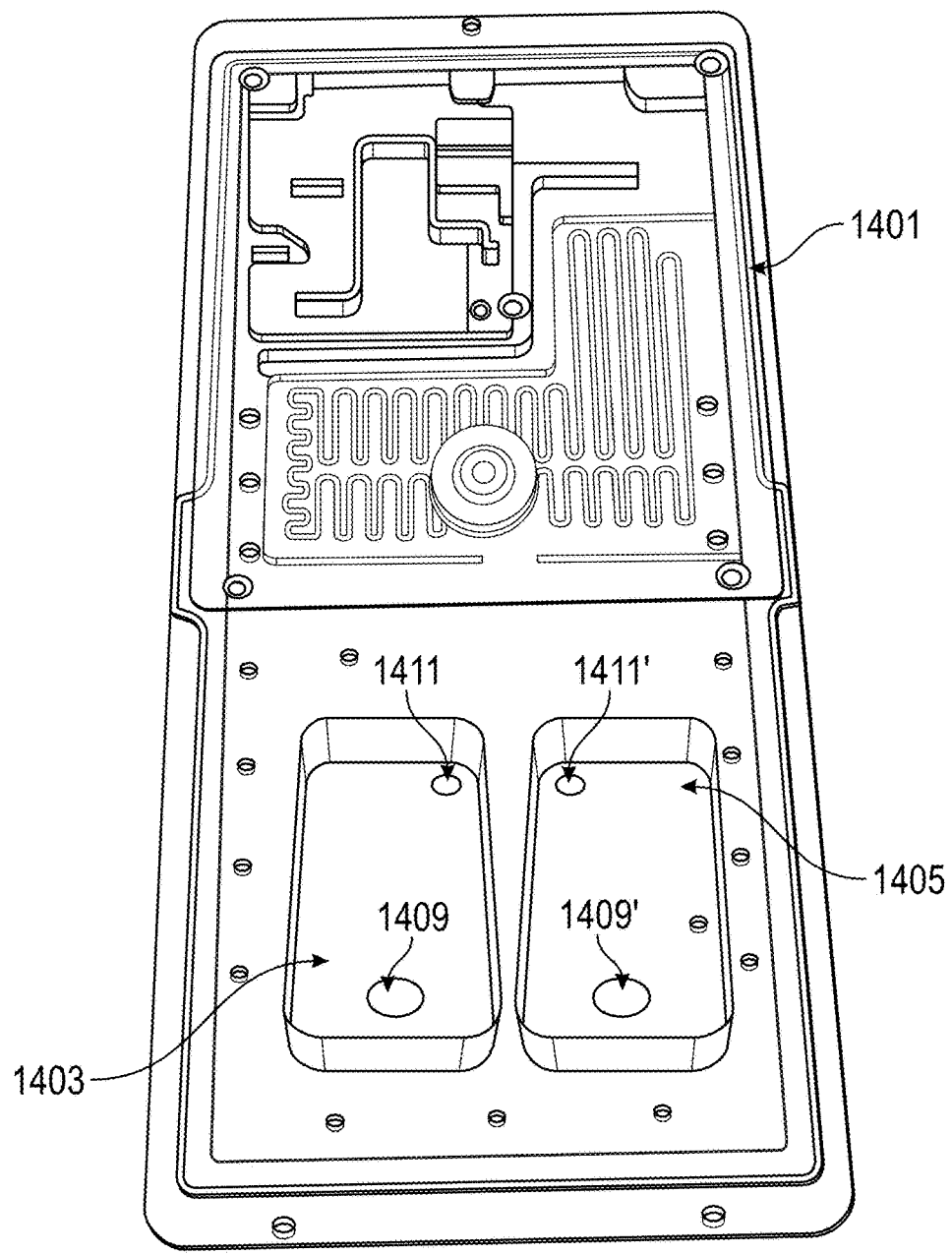
FIGS. 14A and 14B show an example of a cartridge for a DMF apparatus including both sample and waste compartments formed as part of an injection molded cartridge. The sample and waste compartments may be configured to carry large volumes (up to 25 mL) of material.
Figure 14B:
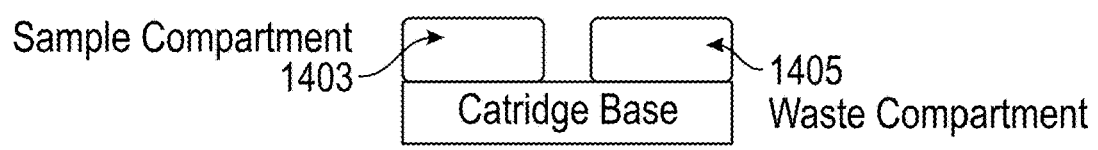

FIGS. 14A and 14B illustrate another example of a cartridge for a DMF apparatus that is configured for use with the application and extraction interface such as those described herein. The cartridge 1401 is similar to those (and may include any of these features) described herein. In FIGS. 14A and 14B, the apparatus includes a pair of sample compartments 1403, 1405. One of the sample compartments may be loaded with a non-waste material (e.g., sample, buffer, saline, etc.), and the other sample compartment may be configured as a waste sample compartment. More than two sample compartments may be included. Each sample compartment may include an inlet 1411, 1411' into the air gap of the DMF apparatus; this inlet may be directly connected to the air gap or may be connected through a microfluidics channel, as described above and illustrated herein. The top of each sample compartment may include a cover (separate covers or a single cover covering each) that includes an inlet for a pump connection to apply positive and/or negative pressure to one or the other (or both) microfluidic portions, e.g., each sample compartment. FIG. 14B shows a side view. The microfluidic portion (e.g., sample chambers and/or microfluidic channels) may be formed in or attached to the top plate.

Thus, any of these apparatuses and methods may include one or more microfluidics channel(s) integrated into the cartridge. In particular, the apparatus may include a microfluidics mixing and extraction region. This is illustrated in FIGS. 15A-15C. For example two microfluidics channels 1501, 1503 may be formed into the top plate of the air gap, and an opening in to the air gap may be positioned within a fixed distance from each other. Fluid may be passed from one microfluidics channel to another microfluidics channel, through the air gap. The region of the air gap between these openings may bridge these two regions 1505. This configuration may be used to mix a larger droplet (e.g., greater than 5 microliters, greater than 7 microliters, greater than 10 microliters, greater than 15 microliters, greater than 20 microliters, greater than 25 microliters, greater than 30 microliters, greater than 1 ml, etc.) than could be easily done within the air gap.

For example, in FIG. 15A, a first pressure source 1507 (negative pressure and/or positive pressure) is shown attached to one end of the microfluidics channel, and a second pressure source 1509 (positive and/or negative pressure) is shown attached to another microfluidics channel. Fluid may be withdrawn from the air gap through the opening 1505 into the first channel 1501; alternatively or additionally, by applying positive pressure 1507, fluid may be moved from the first channel 1501 into the air gap through the opening 1505; concurrently, fluid may be drawn from the air gap at or near the same opening 1505 into the second channel by applying negative pressure 1509 within the second channel. Alternating positive and negative pressure may pass relatively larger volumes of solution between the two microfluidics channels, in and out of the air gap, as shown in FIGS. 15B and 15C.

In the example shown in FIGS. 15A-15C, the top plate integrates microfluidic channels, as well as reservoirs and tubing; alternatively or additionally, one or more ports (e.g., for connecting to the pressure source(s), valves, and the like may be included. For example, a cover over the microfluidics channels may be included with port(s) and/or valves and the like. Positive and negative pressure may be applied within the microfluidics channel(s), for example, by reversing the polarity of a peristaltic pump.

FIGS. 16A-16D illustrate examples of microfluidics channels that may be included. For example, FIG. 16A illustrates the formation of a microfluidics channel formed in part by the top plate. In FIG. 16A, a portion of the channel may be formed in the plate (e.g., the acrylic plate) itself, where a second portion of the channel may be formed from another material that has its other side coated with a conductive material (i.e., indium tin oxide, copper, nickel, chromium and gold). The layers may be held together by an adhesive, and/or may be bonded together.

For example, microfluidic channels in any of the cartridges and apparatuses described herein may be formed by laser cutting. For example, in FIG. 16A, a raster channel may be cut into part B (the acrylic forming the top plate), and a hole may be cut in part B. In addition, one or more pump holes may be cut into part A. a double-sided adhesive (e.g., tape) may be used to secure part A to part B, and a roller may be used to place part A on part B, avoiding air bubbles. Thereafter, pipette holes may be cut out for dispensing reagents, and the bottom may be Teflon (e.g., hydrophobic) coated and the entire assembly baked at between 80-200 degrees (e.g., between 90-18 degrees, etc.). The ground electrode may already be formed onto the plate.

FIG. 16B illustrates another example of a set of microfluidic channels 1605, 1607 formed into the top plate. A set of reagent inlets 1609 are shown as well, providing openings into the air gap region for loading regents. Alternatively or additionally, reagents may be pre-loaded (wet or dry/lyophilized) into the cartridge, including in one or more reservoirs above the top plate or in the top plate, e.g., in a microfluidics channel, and/or directly into the air gap region. FIGS. 16C and 16D illustrate additional examples of microfluidics channels that may be formed into a top plate of a cartridge.

Figure 17A:
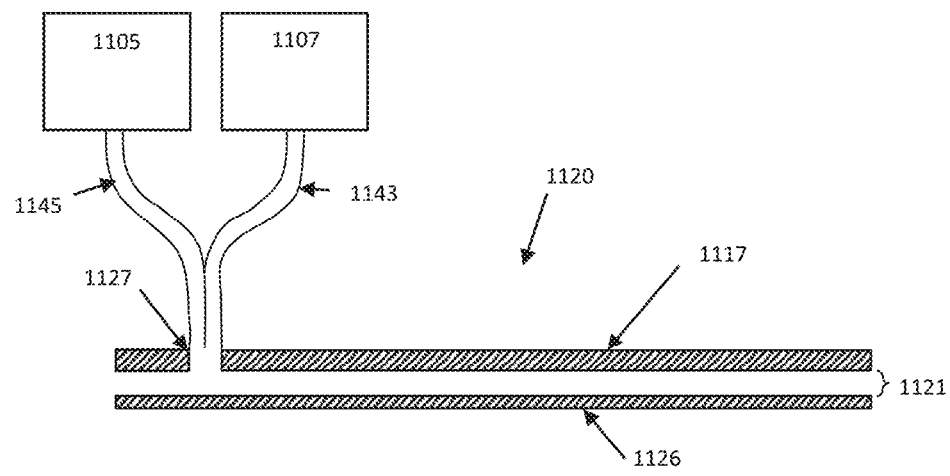
FIGS. 17A and 17B illustrate extraction and mixing of fluid in a DMF apparatus (e.g., cartridge) as described herein, using a fluid application and extraction technique that includes a bifurcated channel, allowing a large volume of fluid to be exchanged between two reservoirs.
Figure 17B:
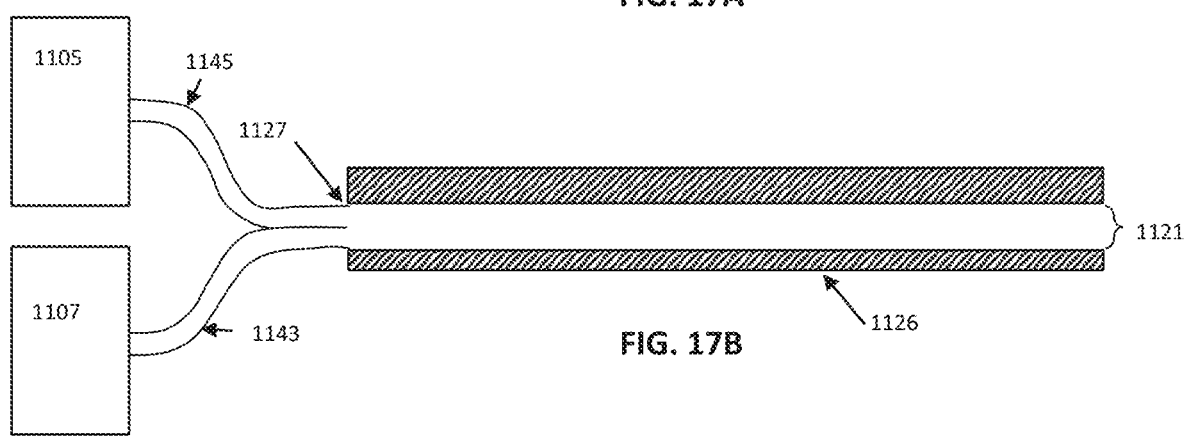

FIGS. 17A and 17B illustrate schematically examples of a method for applying and removing (including washing) fluid to/from the air gap of a DMF apparatus 1120. In FIG. 17A, for example, the air gap 1121 of the cartridge is formed between the top plate 1117 and the bottom dielectric 1126. A connector interface 1127 connects a combined inlet/outlet port for a first fluid channel 1143 and a second fluid channel 1145. These fluid channels may be connected one or more reservoirs 1105, 1107. As already described above, in some variations, two separate connector interfaces (ports) may be used, one connected to each fluid line (e.g., which may be a microfluidics channel, as described above). A bridging droplet in the air gap region 1121 may connect to both inlet and outlet lines, and fluid may be drawn into and out of the fluid lines 1143, 1145 to mix the droplet, add fluid to the droplet, remove fluid from the droplet, expose a solid phase capture element (e.g., magnetic bead, non-magnetic bead, etc.) to the same fluid repetitively to deplete the fluid from the analyte of interest, e.g., to concentrate the analyte on the solid phase or other surfaces), etc.

Figure 17C:
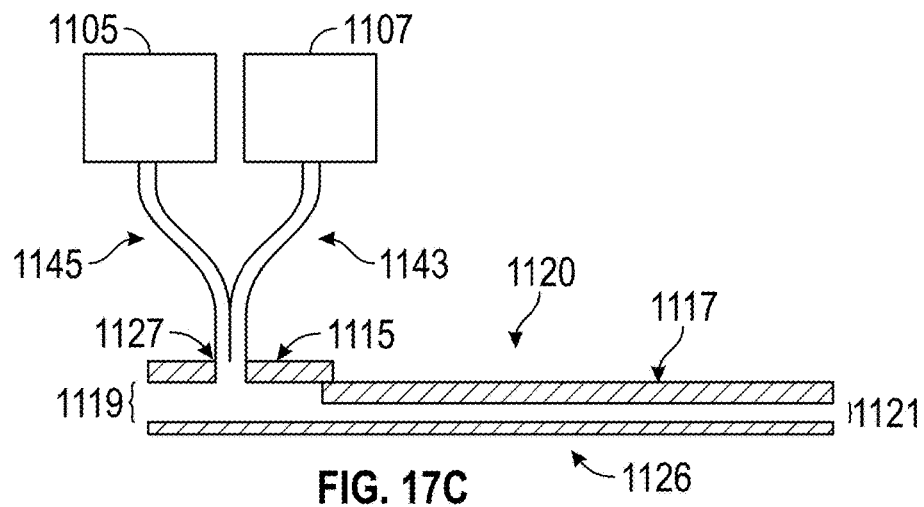
FIG. 17C is another example of a DMF cartridge configured for mixing, extraction, adding, etc. fluid with one or more droplets in the air gap of the DMF cartridge.
Figure 17D:
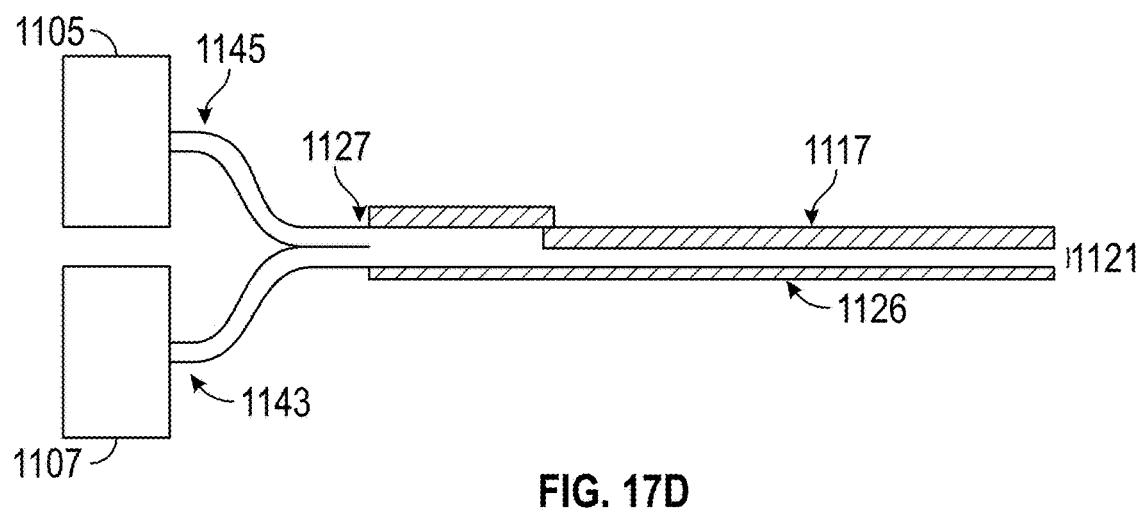
In FIG. 17D, the interface 1127 for the fluid line(s) is at the edge of the air gap, similar to FIG. 17B.

Alternatively, as shown in FIGS. 17C and 17D, the cartridge may include air gaps of different heights. For example, in FIG. 17D, the air gap for the region around the connector interface 1127 may be greater (e.g., between 0.5 and 2 mm) larger than the air gap between other regions of the top plate and the dielectric 1121, as a portion of the top plate 1115 (or a separate top plate 1115 connected to another top plate 1117) may be spaced further from the dielectric top plate 1126. Similarly, in FIG. 17D, the air gap 1119 near the connector interface at the edge of the apparatus may be larger than the air gap 1121 in other regions, e.g., by spacing a portion of the top plate 1117 further from the dielectric 1126 bottom layer.

Figures 18A, 18B, 18C:
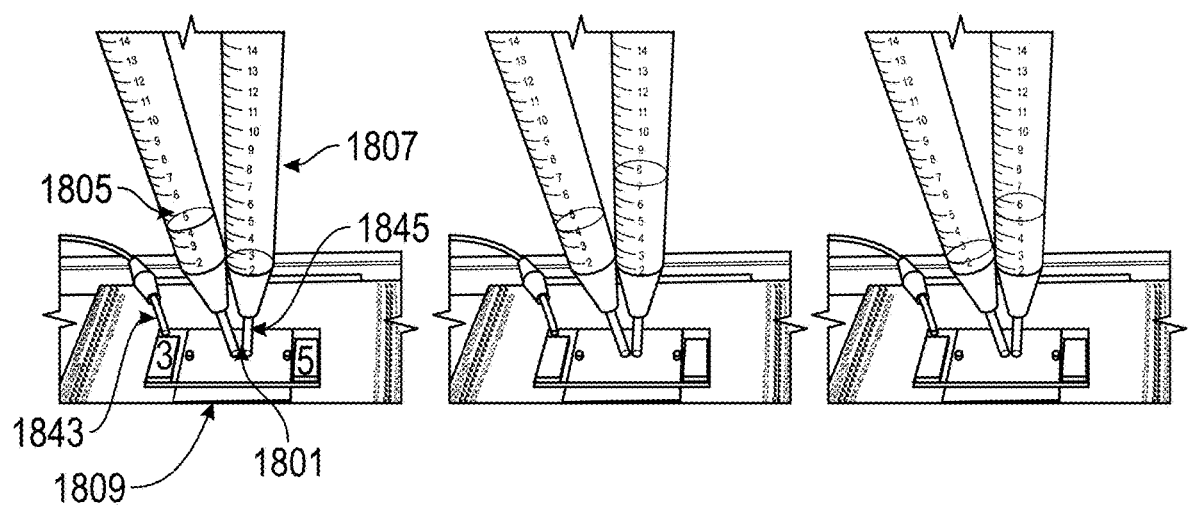
FIGS. 18A-18C illustrate operation of a fluid application and extraction device similar to the one shown in FIG. 17A.

A prototype DMF apparatus and cartridge illustrating the principle shown in FIG. 17C is illustrated in FIGS. 18A-18C, and was used to demonstrate the proof of principle for mixing larger volumes of solution in an air gap of a DMF cartridge. In FIG. 18A, the upper plate of the DMF cartridge included an opening through the top plate 1801 connected to a first fluid line 1843 and a second fluid line 1845. By alternating negative pressure (suction) between the first and second fluid line, fluid was moved back and forth between the first reservoir 1805 and the second reservoir 1807, as shown in the sequence of FIGS. 18A, 18B and 18C. In this example, magnetic particles holding an analyte of interest are magnetically held within the air gap (e.g., against the bottom, e.g., hydrophobic coated dielectric) by the DMF apparatus 1809 while the fluid is exchanged between the reservoirs, enhancing binding and/or rinsing.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points.

For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A digital microfluidics (DMF) apparatus, the apparatus comprising:
    a removable cartridge, the removable cartridge having a bottom and a top, the removable cartridge comprising:
        a first dielectric layer;
        a first hydrophobic layer on first dielectric layer;
        a top plate having a first side and a second side;
        a ground electrode on the first side of the top plate;
        a second hydrophobic layer on the first side of the top plate covering the ground electrode;
        an air gap separating the first hydrophobic layer and the second hydrophobic layer;
        a first sample compartment and a second sample compartment, wherein the first and second sample compartments are on the second side of the top plate;
        a first opening between the first sample compartment and the air gap and a second opening between the second sample compartment and the air gap, wherein the first and second openings are adjacent to each other within about 2 cm or less;
        a first inlet for a first pump connection in communication with the first sample compartment; and
        a second inlet for a second pump connection in communication with the second sample compartment;
        a plurality of actuation electrodes arranged in a first plane adjacent to the first dielectric layer; and
    a fluid application and extraction interface device configured to apply and remove fluid into the air gap,
    wherein application of fluid into and out of the air gap of the removable cartridge is configured to be controlled by activating at least one of the plurality of actuation electrodes adjacent to the first dielectric layer that are between the first and second openings to form a bridging region while passing fluid from the first opening to the second opening, thereby allowing a large volume of fluid to be exchanged between the first sample compartment and the second sample compartment.

2. The apparatus of claim 1, wherein the first dielectric layer comprises a sheet of dielectric material having a first side and a second side, the first side forming an exposed bottom surface on the bottom of the removable cartridge, wherein the first hydrophobic layer is on the second side.

3. The apparatus of claim 2, wherein the sheet of dielectric material is flexible.

4. The apparatus of claim 2, wherein the bottom of the removable cartridge is formed by the first side of the sheet of dielectric material.

5. The apparatus of claim 1, wherein the air gap separating the first hydrophobic layer and the second hydrophobic layer comprises a separation of greater than 500 micrometers.

6. The apparatus of claim 1, wherein the first and second sample compartments are formed in the top plate.

7. The apparatus of claim 1, wherein the first and second sample compartments extend along the second side of the top plate.

8. The apparatus of claim 1, further comprising a top cover covering the first sample compartment, wherein the first inlet is coupled to the top cover.

9. The apparatus of claim 1, wherein the first opening between the first sample compartment and the air gap comprises a first microfluidics channel and wherein the second opening between the second sample compartment and the air gap comprises a second microfluidics channel.

10. The apparatus of claim 1, wherein the first and second sample compartments are each configured to contain more than 1 ml of fluid.

11. The apparatus of claim 1, wherein the first and second sample compartments are each configured to contain up to 25 mL of fluid.

12. The apparatus of claim 1, wherein the top plate comprises an acrylic material.

13. The apparatus of claim 1, further comprising one or more reagent reservoirs on the second side of the top plate.

14. The apparatus of claim 1, further comprising one or more freeze-dried reagent reservoirs on the second side of the top plate.

15. A cartridge for a digital microfluidics (DMF) apparatus, the apparatus comprising:
    a removable cartridge, the removable cartridge having a bottom and a top, the removable cartridge comprising:
        a sheet of dielectric material having a first side and a second side, the first side forming an exposed bottom surface on the bottom of the removable cartridge;
        a first hydrophobic layer on the second side of the sheet of dielectric material;
        a top plate having a first side and a second side;
        a ground electrode on the first side of the top plate;
        a second hydrophobic layer on the first side of the top plate over the ground electrode;

an air gap separating the first hydrophobic layer and the second hydrophobic layer, wherein the air gap comprises a separation of greater than 500 micrometers;

a first sample compartment and a second sample compartment, wherein the first and second sample compartments are on the second side of the top plate;

a first opening between the first sample compartment and the air gap and a second opening between the second sample compartment and the air gap, wherein the first and second openings are adjacent to each other within about 2 cm;

a first inlet for a first pump connection in communication with the first sample compartment; and a second inlet for a second pump connection in communication with the second sample compartment; and a plurality of actuation electrodes arranged in a first plane adjacent to the sheet of dielectric material; and a fluid application and extraction interface device configured to apply and remove fluid into the air gap by applying positive or negative pressure to the first inlet and the second inlet, wherein application of fluid into and out of the air gap of the removable cartridge is configured to be controlled by activating at least one of the plurality of actuation electrodes, adjacent to the sheet of dielectric material to form a bridging region while passing fluid from the first opening to the second opening, thereby allowing a large volume of fluid to be exchanged between the first sample compartment and the second sample compartment.

16. The apparatus of claim 1, wherein the air gap includes different heights.

17. The apparatus of claim 1, wherein a region of the air gap between the first opening and the second opening has a greater height than another region of the air gap distal from the first opening and the second opening.

18. The apparatus of claim 1, wherein the plurality of actuation electrodes are arranged on a seating surface configured to hold the removable cartridge.

* * * * *